United States Patent
Kim et al.

(10) Patent No.: US 11,284,443 B2
(45) Date of Patent: Mar. 22, 2022

(54) METHOD FOR PERFORMING RANDOM ACCESS PROCEDURE AND DEVICE THEREFOR

(71) Applicant: LG Electronics Inc., Seoul (KR)

(72) Inventors: Jaehyung Kim, Seoul (KR); Joonkui Ahn, Seoul (KR); Suckchel Yang, Seoul (KR); Changhwan Park, Seoul (KR); Seokmin Shin, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 87 days.

(21) Appl. No.: 16/610,597

(22) PCT Filed: May 4, 2018

(86) PCT No.: PCT/KR2018/005182
§ 371 (c)(1),
(2) Date: Nov. 4, 2019

(87) PCT Pub. No.: WO2018/203698
PCT Pub. Date: Nov. 8, 2018

(65) Prior Publication Data
US 2020/0068619 A1 Feb. 27, 2020

Related U.S. Application Data

(60) Provisional application No. 62/542,804, filed on Aug. 9, 2017, provisional application No. 62/501,698, filed on May 4, 2017.

(51) Int. Cl.
*H04W 74/08* (2009.01)
*H04W 74/00* (2009.01)
(52) U.S. Cl.
CPC ..... *H04W 74/0833* (2013.01); *H04W 74/004* (2013.01); *H04W 74/006* (2013.01)

(58) Field of Classification Search
CPC .......... H04W 74/0833; H04W 74/004; H04W 74/006
See application file for complete search history.

(56) References Cited

U.S. PATENT DOCUMENTS

2010/0265854 A1* 10/2010 Baldemair .......... H04W 74/004
370/280
2016/0198497 A1 7/2016 Yu et al.
(Continued)

FOREIGN PATENT DOCUMENTS

EP 3606258 2/2020
KR 20080040553 5/2008
(Continued)

OTHER PUBLICATIONS

Intel Corporation, On Random access for NB-IoT, 3GPP TSG RAN WG1 NB-IoT Ad-Hoc Meeting, Budapest, Hungary, Jan. 18-20, 2016, R1-160132 (Year: 2016).*
(Continued)

*Primary Examiner* — Shailendra Kumar
(74) *Attorney, Agent, or Firm* — Fish & Richardson P.C.

(57) ABSTRACT

The present invention relates to a method for performing a random access procedure in a wireless communication system and a device therefor, the method comprising a step for receiving NPRACH configuration information and a step for transmitting a random access preamble on the basis of the NPRACH configuration information, wherein the NPRACH configuration information includes information indicating whether only a first preamble format is supported, only a second preamble format is supported, or both the first preamble format and the second preamble format are supported. If both the first preamble format and the second preamble format are supported according to the NPRACH configuration information, the random access preamble is transmitted using the first preamble format, and, if both the
(Continued)

- Transmit random access preamble using legacy preamble when (N)PDCCH order indicates legacy preamble

- Transmit random access preamble using enhanced preamble when (N)PDCCH order indicates enhanced preamble first preamble format and the second preamble format are supported according to the NPRACH configuration information, the random access preamble is transmitted using the second preamble format.

17 Claims, 14 Drawing Sheets

(56) References Cited

U.S. PATENT DOCUMENTS

| | | | | |
|---|---|---|---|---|
| 2016/0295609 | A1* | 10/2016 | Vajapeyam | ............... H04L 5/14 |
| 2019/0349985 | A1* | 11/2019 | Lin | ...................... H04B 1/7143 |
| 2019/0387550 | A1* | 12/2019 | Pan | ....................... H04L 5/0094 |

FOREIGN PATENT DOCUMENTS

| | | |
|---|---|---|
| KR | 20120123997 | 11/2012 |
| KR | 20130097782 | 9/2013 |
| WO | WO2012150809 | 11/2012 |

OTHER PUBLICATIONS

3rd Generation Partnership Project; Technical Specification Group Radio Access Network; Evolved Universal Terrestrial Radio Access (E-UTRA); Radio Resource Control (RRC); 3GPP TS 36.331 V14.2.2 (Apr. 2017) (Year: 2017).*

3rd Generation Partnership Project; Technical Specification Group Radio Access Network; Evolved Universal Terrestrial Radio Access (E-UTRA); Physical channels and modulation, 3GPP TS 36.211 V14.2.0 (Mar. 2017) (Year: 2017).*

ZTE, Summary of email discussion [93bis#07][NB-IOT] RACH open issues, 3GPP TSG-RAN WG2 # 94, Nanjing, China, May 23-27, 2016, R2-163638 (Year: 2016).*

3rd Generation Partnership Project; Technical Specification Group Radio Access Network; Evolved Universal Terrestrial Radio Access (E-UTRA);Medium Access Control (MAC) protocol specification, 3GPP TS 36.321 V14.2.1 (Mar. 2017) (Year: 2017).*

3rd Generation Partnership Project; Technical Specification Group Radio Access Network, "Evolved Universal Terrestrial Radio Access (E-UTRA); Radio Resource Control (RRC); Protocol specification (Release 14)," 3GPP TS 36.331, V14.2.2, dated Apr. 2017, 694 pages, XP051298184.

Ericsson, "Analysis of Random Access requirements in NB-IoT," R4-161946, 3GPP TSG RAN WG4 Meeting #78bis, San José del Cabo, Mexico, dated Apr. 11-15, 2016, 5 pages.

LG Electronics, "NPRACH enhancement in NB-IoT," R1-1704850, 3GPP TSG RAN WG1 Meeting #88bis, Spokane, USA, dated Apr. 3-7, 2017, 3 pages.

PCT International Search Report and Written Opinion in International Application No. PCT/KR2018/005182, dated Aug. 24, 2018, 21 pages (with English translation).

EP Extended Search Report in European Appln. No. 18794994.6, dated Dec. 8, 2020, 14 pages.

Intel Corporation, "On Random access for NB-IoT," R1-160132, 3GPP TSG RAN WG1 NB-IoT Ad-Hoc Meeting, Budapest, Hungary, Jan. 18-20, 2016, 8 pages, XP51053451.

ZTE, "Summary of email discussion [93bis#07][NB-IoT] RACH open issues," R2-163638, 3GPP TSG RAN WG2 #94, Nanjing, China, May 23-27, 2016, 10 pages, XP051105070.

3rd Generation Partnership Project; Technical Specification Group Radio Access Network; "Technical Specification Group Radio Access Network; Evolved Universal Terrestrial Radio Access (E-UTRA); Physical channels and modulation (Release 14)," 3GPP TS 36.211 V14.2.0, Sophia-Antipolis Cedex, France, Mar. 23, 2017, 39 pages, XP051291424.

3rd Generation Partnership Project; Technical Specification Group Radio Access Network; "Evolved Universal Terrestrial Radio Access (E-UTRA); Medium Access Control (MAC) protocol specification (Release 14)," 3GPP TS 36.321 V14.2.0, dated Mar. 2017, 106 pages, XP051291361.

* cited by examiner

FIG. 11

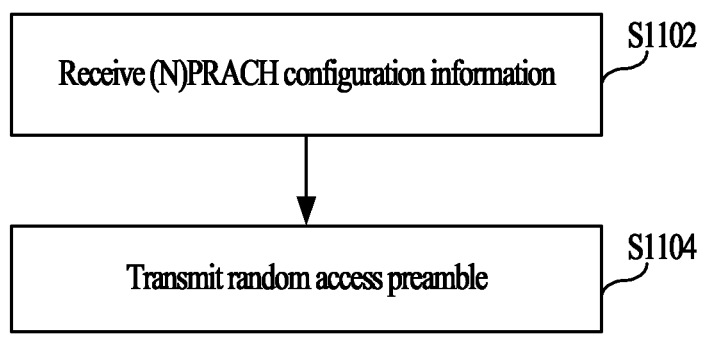

- When only legacy preamble is supported according to (N)PRACH configuration information, transmit random access preamble using legacy preamble

- When only enhanced preamble is supported according to (N)PRACH configuration information, transmit random access preamble using enhanced preamble

- When both legacy preamble and enhanced preamble are supported according to (N)PRACH configuration information, transmit random access preamble using legacy or enhanced preamble according to whether specific condition is satisfied

FIG. 12
(a)
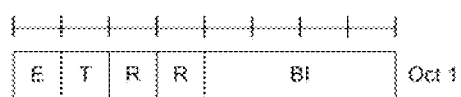
(b)
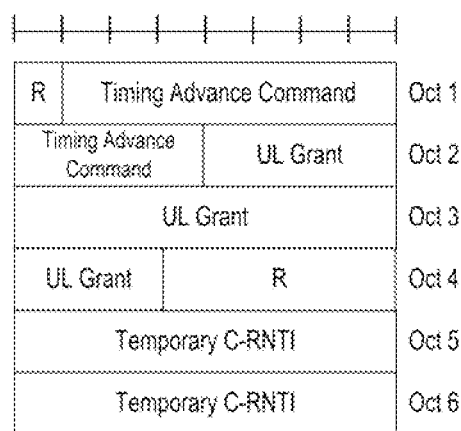
(c)

- Transmit random access preamble using legacy preamble when (N)PDCCH order indicates legacy preamble

- Transmit random access preamble using enhanced preamble when (N)PDCCH order indicates enhanced preamble

METHOD FOR PERFORMING RANDOM ACCESS PROCEDURE AND DEVICE THEREFOR

CROSS-REFERENCE TO RELATED APPLICATIONS

This application is the National Phase of PCT International Application No. PCT/KR2018/005182, filed on May 4, 2018, which claims priority under 35 U.S.C. 119(e) to U.S. Provisional Application No. 62/501,698 filed on May 4, 2017 and No. 62/542,804 filed on Aug. 9, 2017 which is hereby incorporated by reference herein in their entirety.

TECHNICAL FIELD

The present disclosure relates to a wireless communication system. More specifically, the present disclosure relates to a method of performing a random access procedure for effective coverage enhancement and an apparatus therefor.

BACKGROUND ART

When a new radio access technology (RAT) system is introduced, as more and more communication devices require larger communication capacity, there is a need for improved mobile broadband communication as compared to existing RAT. In addition, massive machine type communications (MTC) connected to a plurality of devices and things to provide various services anytime and anywhere is one of main issues to be considered in next-generation communication. In addition, communication system design considering services/UEs sensitive to reliability and latency has been discussed. As such, considering enhanced mobile broadband communication (eMBB), massive MTC (mMTC), URLLC (Ultra-Reliable Low-Latency Communication), etc, the next generation wireless access technology is being discussed, and such a technology is referred to as new RAT (NR) for convenience.

DISCLOSURE

Technical Problem

An object of the present disclosure is to provide a method for performing a random access procedure for effective range enhancement in a wireless communication system, and an apparatus therefor.

Specifically, an object of the present disclosure is to provide a method for effectively performing a random access procedure in a wireless communication system that simultaneously supports a legacy preamble and an enhanced preamble for narrowband Internet of Things (NB-IoT) communication, and an apparatus therefor.

It will be understood by persons skilled in the art that the objects that can be achieved with the present disclosure are not limited to what has been particularly described hereinabove and other objects that the present disclosure can achieve will be more clearly understood from the following detailed description.

Technical Solution

In a first aspect of the present disclosure, provided herein is a method for performing a random access procedure by a user equipment in a wireless communication system, the method comprising: receiving narrowband physical random access channel (NPRACH) configuration information; and transmitting a random access preamble based on the NPRACH configuration information, wherein the NPRACH configuration information comprises information indicating whether only a first preamble format is supported, only a second preamble format is supported, or both the first preamble format and the second preamble format are supported, wherein, when both the first preamble format and the second preamble format are supported according to the NPRACH configuration information and a specific condition is satisfied, the random access preamble is transmitted using the first preamble format, and wherein, when both the first preamble format and the second preamble format are supported according to the NPRACH configuration information and the specific condition is not satisfied, the random access preamble is transmitted using the second preamble format.

In a second aspect of the present disclosure, provided herein is a user equipment for performing a random access procedure in a wireless communication system, the user equipment comprising: a radio frequency (RF) transceiver; and a processor operatively connected to the RF transceiver, wherein the processor is configured to: control the RF transceiver to receive narrowband physical random access channel (NPRACH) configuration information, and control the RF transceiver to transmit a random access preamble based on the NPRACH configuration information, wherein the NPRACH configuration information comprises information indicating whether only a first preamble format is supported, only a second preamble format is supported, or both the first preamble format and the second preamble format are supported, wherein, when both the first preamble format and the second preamble format are supported according to the NPRACH configuration information and a specific condition is satisfied, the random access preamble is transmitted using the first preamble format, and wherein, when both the first preamble format and the second preamble format are supported according to the NPRACH configuration information and the specific condition is not satisfied, the random access preamble is transmitted using the second preamble format.

Preferably, the specific condition may comprise at least one of a condition that a Reference Signals Received Power (RSRP) is greater than or equal to a first value, a condition that a repetition level configured for the user equipment is greater than or equal to a second value, or a condition that a coverage level is less than or equal to a third value.

Preferably, the first preamble format may comprise a cyclic prefix corresponding to one symbol, and the second preamble format may comprise a cyclic prefix corresponding to a plurality of symbols.

Preferably, the first preamble format may have a subcarrier spacing of 3.75 kHz, and the second preamble format may have a subcarrier spacing of 3.75/N kHz, and N is an integer greater than 1.

Preferably, a random access response message may be received using a random access radio network temporary identifier (RA-RNTI), and different RA-RNTIs may be used for the first preamble format and the second preamble format.

Preferably, a random access response message may be received using a random access radio network temporary identifier (RA-RNTI), and the same RA-RNTI may be used for the first preamble format and the second preamble format, and a header or payload of the random access response message contains information for distinguishing between the first preamble format and the second preamble format.

Preferably, when a random access response message corresponding to the random access preamble fails to be received, the random access preamble may be retransmitted, wherein retransmitting the random access preamble comprises: increasing a counter value, when the increased counter value is less than a maximum counter value, retransmitting the random access preamble using the same preamble format as before, and when the increased counter value is equal to the maximum counter value, retransmitting the random access preamble using a different preamble format than before.

Preferably, when a random access response message corresponding to the random access preamble fails to be received, the random access preamble may be retransmitted using a different preamble format than before.

Preferably, a random access response message containing a first timing advance command may be received, a radio resource control (RRC) connection request message may be transmitted by applying the first timing advance command, a contention resolution message containing a second timing advance command may be received, and a hybrid automatic repeat and request acknowledgement (HARQ-ACK) signal for the contention resolution message may be transmitted by applying the second timing advance command.

Preferably, a random access response message containing a first timing advance command may be received, a radio resource control (RRC) connection request message may be transmitted by applying the first timing advance command, when a contention resolution message corresponding to the transmitted RRC connection request message fails to be received, the RRC connection request message may be retransmitted by applying a second timing advance command, and when a contention resolution message corresponding to the retransmitted RRC connection request message fails to be received, the RRC connection request message may be retransmitted by applying a third timing advance command.

Advantageous Effects

According to the present disclosure, a range may be effectively enhanced in performing a random access procedure in a wireless communication system.

Specifically, according to the present disclosure, the random access procedure may be effectively performed in a wireless communication system that simultaneously supports a legacy preamble and an enhanced preamble for narrowband IoT (NB-IoT) communication.

It will be understood by persons skilled in the art that the objects that can be achieved with the present disclosure are not limited to what has been particularly described hereinabove and other objects that the present disclosure can achieve will be more clearly understood from the following detailed description.

DESCRIPTION OF DRAWINGS

The accompanying drawings, which are included to provide a further understanding of the disclosure, illustrate embodiments of the disclosure and together with the description serve to explain the principle of the disclosure.

FIG. 11 illustrates a random access preamble transmission method according to the present disclosure.

FIG. 12 illustrates an RAR message header and payload for a legacy UE.

MODE FOR INVENTION

Figure 1:
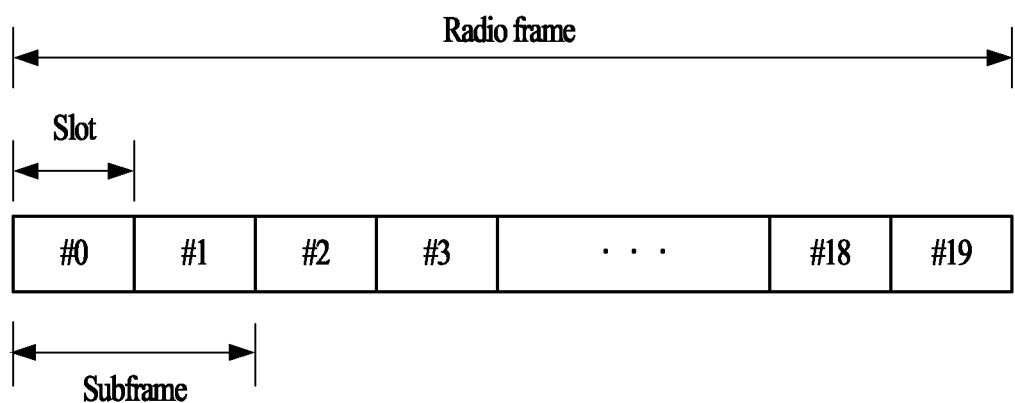
FIG. 1 illustrates a structure of a radio frame that may be used in the present disclosure.

The following embodiments of the present disclosure can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access network (UTRAN) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRAN (E-UTRAN). UTRAN is a part of universal mobile telecommunications system (UMTS). 3rd generation partnership project (3GPP) long term evolution (LTE) is a part of E-UMTS (Evolved UMTS), which uses E-UTRAN. 3GPP LTE-Advanced (LTE-A) system is an evolved version of 3GPP LTE, and LTE-A Pro system is an evolved version of 3GPP LTE-A.

For clarity of explanations, the following description focuses on 3GPP LTE/LTE-A/LTE-A Pro system. However, technical principles of the present disclosure are not limited thereto. Further, a particular terminology is provided for better understanding of the present disclosure. However, such a particular terminology may be changed without departing from the technical principles of the present disclosure. For example, the present disclosure may be applied to a system in accordance with a 3GPP LTE/LTE-A/LTE-A Pro system as well as a system in accordance with another 3GPP standard, IEEE 802.xx standard, 3GPP2 standard, or a next-generation communication system such as 3GPP 5G or New RAT (NR).

In the present specification, a user equipment (UE) may be fixed or mobile, and may be various kinds of equipment that transmit and receive data and/or control information to communicate with a base station (BS). The UE may be referred to as a terminal, mobile station (MS), mobile terminal (MT), user terminal (UT), subscribe station (SS), wireless device, personal digital assistant (PDA), wireless modem, handheld device, etc. In the present specification, a UE may be interchangeably referred to as a terminal.

In the present specification, a base station (BS) generally refers to a fixed station that performs communication with a UE and/or another BS, and exchanges various kinds of data and control information with the UE and another BS. The base station (BS) may be referred to as an advanced base station (ABS), a node-B (NB), an evolved node-B (eNB), next generation NodeB (gNB), a base transceiver system (BTS), an access point (AP), a processing server (PS), a transmission point (TP), etc. In the present specification, a base station (BS) may be interchangeably referred to as an eNB or gNB.

In a wireless access system, a user equipment (UE) may receive information from a base station (BS) in downlink (DL) and transmit information in uplink (UL). The information transmitted or received by the UE may include data and various control information. In addition, there are various physical channels according to the type or use of the information transmitted or received by the UE.

When a UE is powered on or enters a new cell, the UE performs initial cell search. The initial cell search involves acquisition of synchronization to a base station. To this end, the UE synchronizes its timing to the base station and acquires information such as a cell identifier (ID) by receiving a primary synchronization signal (PSS) and a secondary synchronization signal (SSS) from the base station. Then the UE may acquire system information broadcasted in the cell through a physical broadcast channel (PBCH) from the base station. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH.

To complete access to the base station, the UE may perform a random access procedure with the base station. To this end, the UE may transmit a preamble through a physical random access channel (PRACH) and may receive a response message to the preamble through a PDCCH and a PDSCH associated with the PDCCH. In the case of a contention-based random access, the UE may additionally perform a contention resolution procedure including transmission of an additional PRACH and reception of a PDCCH signal and a PDSCH signal corresponding to the PDCCH signal.

After the above procedure, the UE may receive a PDCCH and/or a PDSCH from the base station and transmit a physical uplink shared channel (PUSCH) and/or a physical uplink control channel (PUCCH) to the base station, in a general UL/DL signal transmission procedure. Information that the UE transmits to the base station is called Uplink Control Information (UCI). The UCI includes hybrid automatic repeat and request acknowledgement/negative acknowledgement (HARQ-ACK/NACK), scheduling request (SR), channel state information (CSI), etc. The CSI includes channel quality indicator (CQI), precoding matrix indicator (PMI), rank indication (RI), etc. UCI is generally transmitted through a PUCCH periodically. However, if control information and traffic data should be transmitted simultaneously, they may be transmitted through a PUSCH. In addition, the UCI may be transmitted aperiodically through the PUSCH, upon receipt of a request/command from a network.

FIG. 1 illustrates a structure of a radio frame that may be used in the present disclosure. In a cellular orthogonal frequency division multiplexing (OFDM) radio packet communication system, uplink/downlink data packet transmission is performed in subframe units and one subframe is defined as a predetermined duration including a plurality of OFDM symbols. The LTE(-A) standard supports a type-1 radio frame structure applicable to frequency division duplex (FDD) and a type-2 radio frame structure applicable to time division duplex (TDD).

FIG. 1 illustrates the structure of the type-1 radio frame. For example, a downlink radio frame includes 10 subframes and one subframe includes two slots in a time domain. A time required to transmit one subframe is referred to as a transmission time interval (TTI). Or, TTI may refer to a time interval required to transmit one slot. For example, one subframe has a length of 1 ms and one slot has a length of 0.5 ms. One slot includes a plurality of OFDM symbols in a time domain and includes a plurality of resource blocks (RBs) in a frequency domain. In the LTE(-A) system, since OFDM is used in downlink, an OFDM symbol indicates one symbol period. The OFDM symbol may be referred to as an SC-FDMA symbol or symbol period. A resource block (RB) as a resource allocation unit may include a plurality of consecutive subcarriers in one slot.

The number of OFDM symbols included in one slot may vary according to the configuration of a cyclic prefix (CP). The CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

The type-2 radio frame includes two half frames and each half frame includes five subframes, a downlink pilot time slot (DwPTS), a guard period (GP) and an uplink pilot time slot (UpPTS). One subframe includes two slots. For example, a downlink slot (e.g., DwPTS) is used for initial cell search, synchronization or channel estimation of a UE. For example, an uplink slot (e.g., UpPTS) is used for channel estimation of a base station and uplink transmission synchronization of a UE. For example, the uplink slot (e.g., UpPTS) may be used to transmit a sounding reference signal (SRS) for channel estimation in a base station and to transmit a physical random access channel (PRACH) that carriers a random access preamble for uplink transmission synchronization. The GP is used to eliminate interference generated in uplink due to multi-path delay of a downlink signal between uplink and downlink.

The above-described radio frame structures are purely exemplary, and thus the number of subframes in a radio frame, the number of slots in a subframe, or the number of symbols in a slot may vary in different ways.

Figure 2:
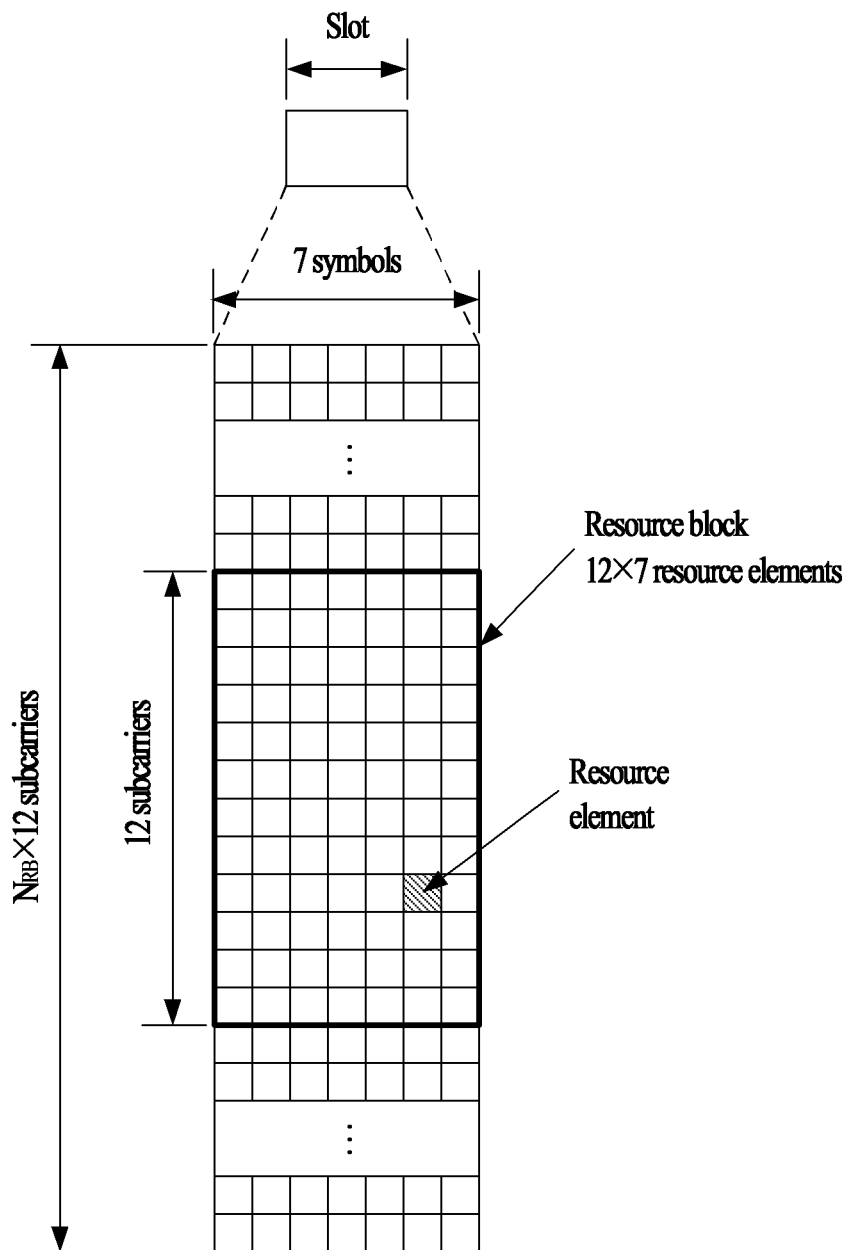
FIG. 2 illustrates a resource grid of a downlink slot that may be used in the present disclosure.

FIG. 2 illustrates a resource grid of one downlink slot that may be used in the present disclosure.

Referring to FIG. 2, a downlink slot includes a plurality of OFDM symbols in the time domain. One downlink slot may include 7 OFDM symbols and a resource block (RB)

may include 12 subcarriers in the frequency domain. However, the present disclosure is not limited thereto. Each element of the resource grid is referred to as a Resource Element (RE). One RB includes 12×7 REs. The number of RBs in a DL slot, $N^{DL}$, depends on a downlink transmission bandwidth. An uplink slot may have the same structure as a downlink slot.

The above-described resource grid of a slot is exemplary, and thus the number of symbols, the number of resource elements, the number of RBs included in the slot may vary in different ways.

Figure 3:
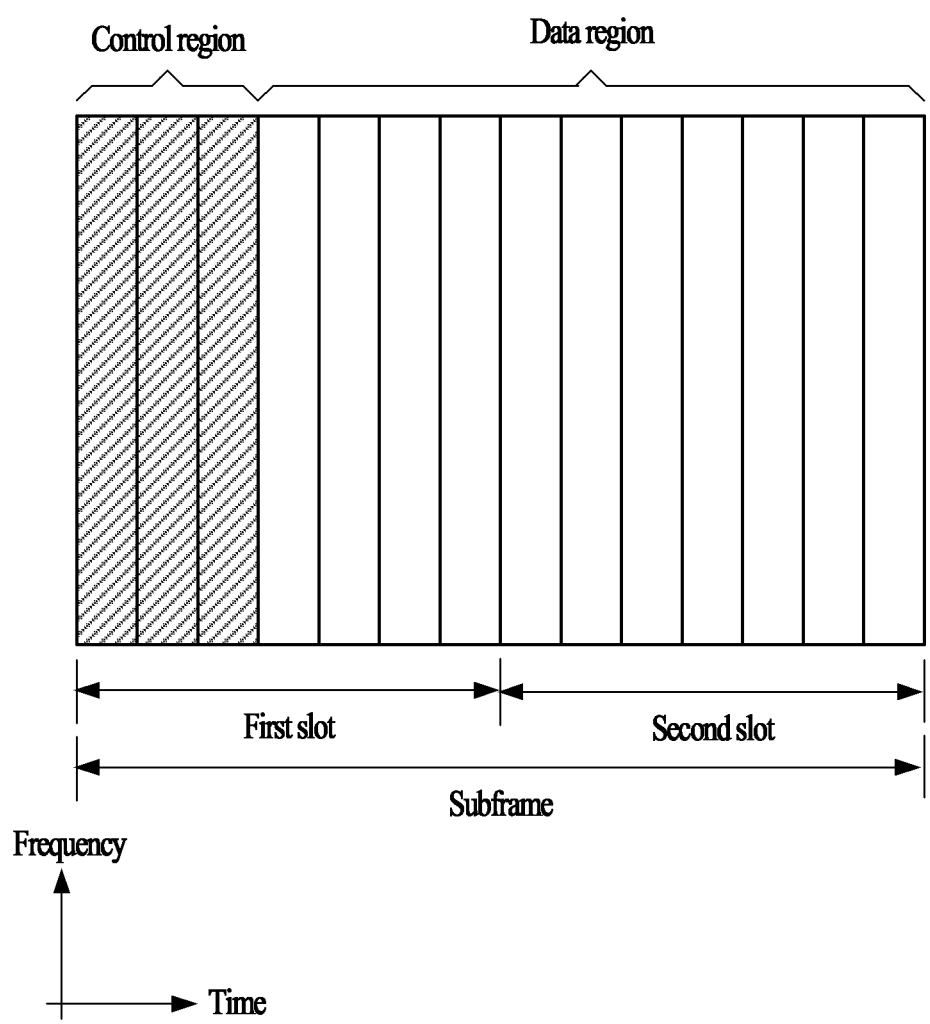
FIG. 3 illustrates a downlink subframe structure that may be used in the present disclosure.

FIG. 3 illustrates a downlink subframe structure that may be used in the present disclosure.

Referring to FIG. 3, a maximum of three (or four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is RB. Examples of downlink control channels used in the LTE(-A) system include a physical control format indicator channel (PCFICH), a physical downlink control channel (PDCCH), a physical hybrid ARQ indicator channel (PHICH), etc.

PCFICH is transmitted at the first (or starting) OFDM symbol of a subframe and carries information regarding the number of OFDM symbols used for transmission of control channels within the subframe. The PCFICH is composed of four resource element groups (REGs), and each REG is uniformly distributed in a control region based on a cell ID. One REG may comprise 4 resource elements. The PCFICH indicates a value of 1 to 3 (or 2 to 4) and is modulated via quadrature phase shift keying (QPSK). The PHICH is a response of uplink transmission and carries an HARQ ACK/NACK signal. The PHICH is allocated on the remaining REGs other than CRS and PCFICH (a first OFDM symbol) in one or more OFDM symbols configured by PHICH duration. The PHICH is allocated to three REGs that are distributed if possible in the frequency domain. More detailed description regarding PHICH will be provided below in the present specification.

The PDCCH is allocated in first n OFDM symbols (hereinafter, a control region) of a subframe. Here, n is an integer equal to or greater than 1 and is indicated by the PCFICH. Control information transmitted through the PDCCH is referred to as downlink control information (DCI). A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. DCI format optionally includes information about hopping flag, RB allocation, modulation coding scheme (MCS), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

The base station determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC. When the PDCCH is for uplink power control, transmit power control-RNTI (TPC-RNTI) may be used, and the TPC-RNTI may include TPC-PUCCH-RNTI for PUCCH power control and TPC-PUSCH-RNTI for PUSCH power control. When the PDCCH is for multicast control channel (MCCH), multimedia broadcast multicast service-RNTI (M-RNTI) may be used.

Control information transmitted through the PDCCH is referred to as downlink control information (DCI). Various DCI formats are defined according to their usage. Specifically, DCI format 0, 4 (hereinafter, UL grant) are defined for uplink scheduling, and DCI formats 1, 1A, 1B, 1C, 1D, 2, 2A, 2B, 2C, and 2D (hereinafter, DL grant) are defined for downlink scheduling. DCI format optionally includes information about hopping flag, RB allocation, modulation coding scheme (MCS), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

The LTE(-A) system defines a limited set of CCE positions in which a PDCCH is to be positioned for each UE. A limited set of CCE positions that a UE can find a PDCCH of the UE may be referred to as a search space (SS). In the LTE(-A) system, the search space has different sizes according to each PDCCH format. In addition, a UE-specific search space and a common search space are separately defined. The base station does not provide the UE with information indicating where the PDCCH is located in the control region. Accordingly, the UE monitors a set of PDCCH candidates within the subframe and finds its own PDCCH. The term "monitoring" means that the UE attempts to decode the received PDCCHs according to respective DCI formats. The monitoring for a PDCCH in a search space is referred to as blind decoding (or blind detection). Through blind decoding, the UE simultaneously performs identification of the PDCCH transmitted to the UE and decoding of the control information transmitted through the corresponding PDCCH.

Figure 4:
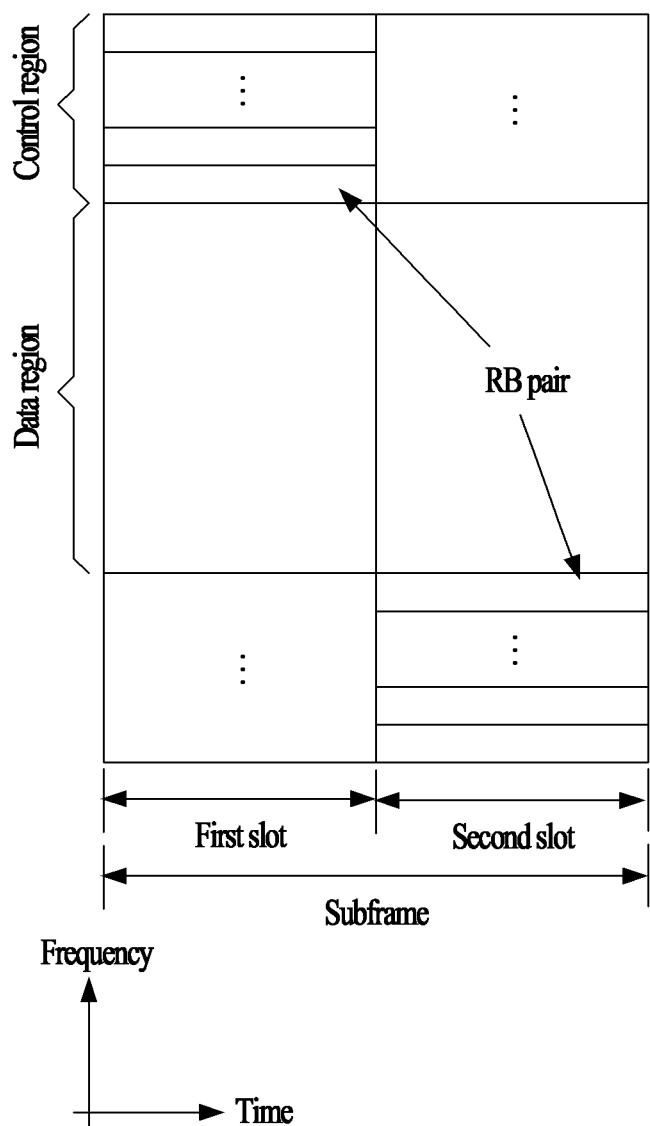
FIG. 4 illustrates an uplink subframe structure that may be used in the present disclosure.

FIG. 4 illustrates an exemplary structure of an uplink subframe that may be used in the present disclosure.

Referring to FIG. 4, the uplink subframe includes a plurality of slots (for example, two). Each slot may include a plurality of SC-FDMA symbols, wherein the number of SC-FDMA symbols included in each slot is varied depending on a cyclic prefix (CP) length. In an example, a slot may comprise 7 SC-FDMA symbols in case of normal CP. An uplink subframe is divided into a data region and a control region in a frequency domain. The data region includes a PUSCH, and is used to transmit a data signal that includes voice information. The control region includes a PUCCH, and is used to transmit uplink control information (UCI).

The PUCCH includes RB pair (e.g. m=0,1,2,3) located at both ends of the data region on a frequency axis, and performs hopping on the border of the slots.

Figure 5:
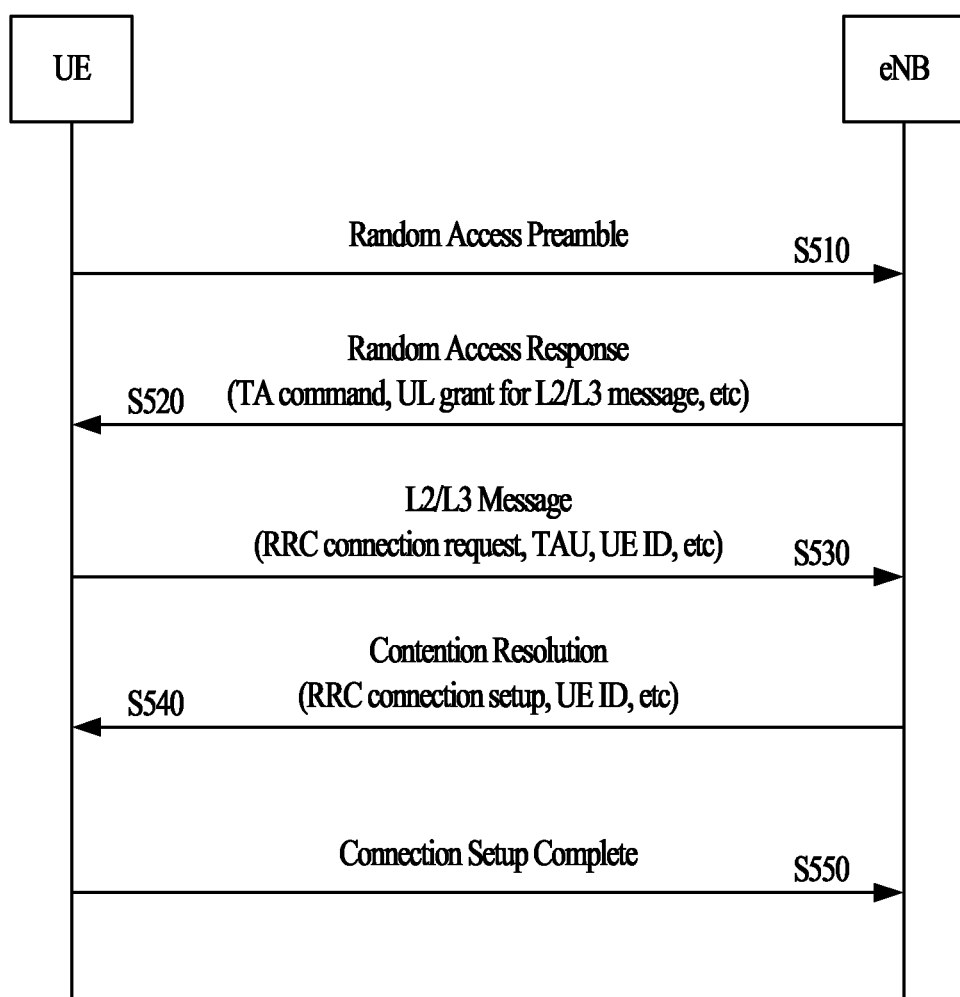
FIG. 5 illustrates a random access procedure.

FIG. 5 illustrates a random access procedure.

The random access procedure is used to transmit (short-length) data in uplink. For example, the random access procedure is performed upon initial access in an RRC IDLE state, upon initial access after radio link failure, upon handover requiring the random access procedure, and upon the occurrence of uplink/downlink data requiring the random access procedure during an RRC CONNECTED state. Some Radio Resource Control (RRC) messages such as an RRC connection request message, a cell update message, and a URA update message are transmitted using a random access procedure. Logical channels such as a Common Control Channel (CCCH), a Dedicated Control Channel (DCCH), or a Dedicated Traffic Channel (DTCH) can be mapped to a transport channel (RACH). The transport channel (RACH) can be mapped to a physical channel (e.g., Physical Random Access Channel (PRACH)). When a UE MAC layer instructs a UE physical layer to transmit a PRACH, the UE physical layer first selects an access slot and a signature and transmits a PRACH preamble in uplink. The random access procedure is divided into a contention-based procedure and a non-contention-based procedure.

With reference to FIG. 5, a UE receives and stores information regarding random access from a base station through system information. Thereafter, when random access is needed, the UE transmits a random access preamble (referred to as Message 1 or Msg1) to the base station (S510). Upon receiving the random access preamble from the UE, the base station transmits a random access response message (referred to as Message 2 or Msg2) to the UE (S520). Specifically, downlink scheduling information for the random access response message may be CRC-masked with a Random Access-RNTI and may be transmitted through an L1/L2 control channel (PDCCH). Upon receiving the downlink scheduling signal masked with the RA-RNTI, the UE may receive and decode a random access response message from a Physical Downlink Shared Channel (PDSCH). Thereafter, the UE checks whether or not random access response information corresponding to the UE is present in the received random access response message. Whether or not random access response information corresponding to the UE is present can be determined based on whether or not a Random Access preamble ID (RAID) for the preamble that the UE has transmitted is present. The random access response information includes Timing Advance (TA) indicating timing offset information for synchronization, information of allocation of radio resources used in uplink, and a temporary identity (e.g., T-CRNTI) for user identification. Upon receiving the random access response information, the UE transmits an uplink message (referred to as Message 3 or Msg3) including an RRC connection request message through an uplink Shared Channel (SCH) according to radio resource allocation information included in the response information (S530). After receiving the uplink message from the UE, the base station transmits a message for contention resolution (referred to as Message 4 or Msg4) to the UE (S540). The message for contention resolution may be referred to as a contention resolution message, and may include an RRC connection setup message. After the UE receives the contention resolution message, the UE transmits a connection setup complete message (referred to as Message 5 or Msg5) to the base station (S550).

In case of a non-contention based procedure, a base station may allocate a non-contention random access preamble to a UE before the UE transmits a random access preamble (S510). The non-contention random access preamble may be allocated through a dedicated signaling such as a handover command or PDCCH. In case that a UE is allocated with a non-contention random access preamble, the UE may transmit the allocated non-contention random access preamble to a base station in a similar manner as S510. If the base station receives the non-contention random access preamble from the UE, the base station may transmit a random access response (referred to as Message 2) to the UE in a similar manner as S520.

During the above-described random access procedure, HARQ may not be applied to a random access response (S520), but HARQ may be applied to an uplink transmission for the random access response or a message for contention resolution. Thus, the UE does not have to transmit ACK/NACK in response the random access response.

A next generation of LTE-A system is considering to configure a user equipment (UE) at a low cost/low specification mainly focusing on data communication such as metering of a gauge meter, measurement of a water level, utilization of a monitoring camera, inventory report of a vending machine, and the like. Such a UE is to provide appropriate throughputs between connected devices even though it has a low complexity and consumes low power, and the UE is referred to as a machine type communication (MTC) UE or IoT (Internet of Things) UE for convenience, and the UE may be briefly referred to as a user equipment (UE).

Further, when the next generation system utilizes a cellular network or a third-party network, the next generation system can perform communication using a narrow band (or NB-IoT communication). For example, the narrow band may be 180 kHz. A UE (or NB-IoT UE) or an eNB transmits a single channel or a plurality of physical channels by multiplexing the channel(s) in a corresponding region. Meanwhile, the NB-IoT UE can perform communication even in such an area where channel environment is poor as under a bridge, under the sea, on the sea, and the like. In this case, in order to compensate for the poor channel environment, the NB-IoT UE may perform repetitive transmission on a specific channel (e.g., repetitive transmission during several TTIs) and/or perform power boosting. As an example of the power boosting, a region of a frequency resource to be transmitted on a specific band is more reduced to concentrate power per hour on a specific resource. For example, when a specific channel is transmitted via an RB (resource block) consisting of 12 REs, it may concentrate power to be distributed via the entire RB on a specific RE(s) by allocating the power to the specific RE instead of RE allocation in an RB unit. In particular, a scheme of performing communication by concentrating data and power on a single RE belonging to an RB is commonly referred to as a single-tone transmission scheme. NB-IoT may be interchangeably referred to as cellular IoT (cIoT).

Figure 6:
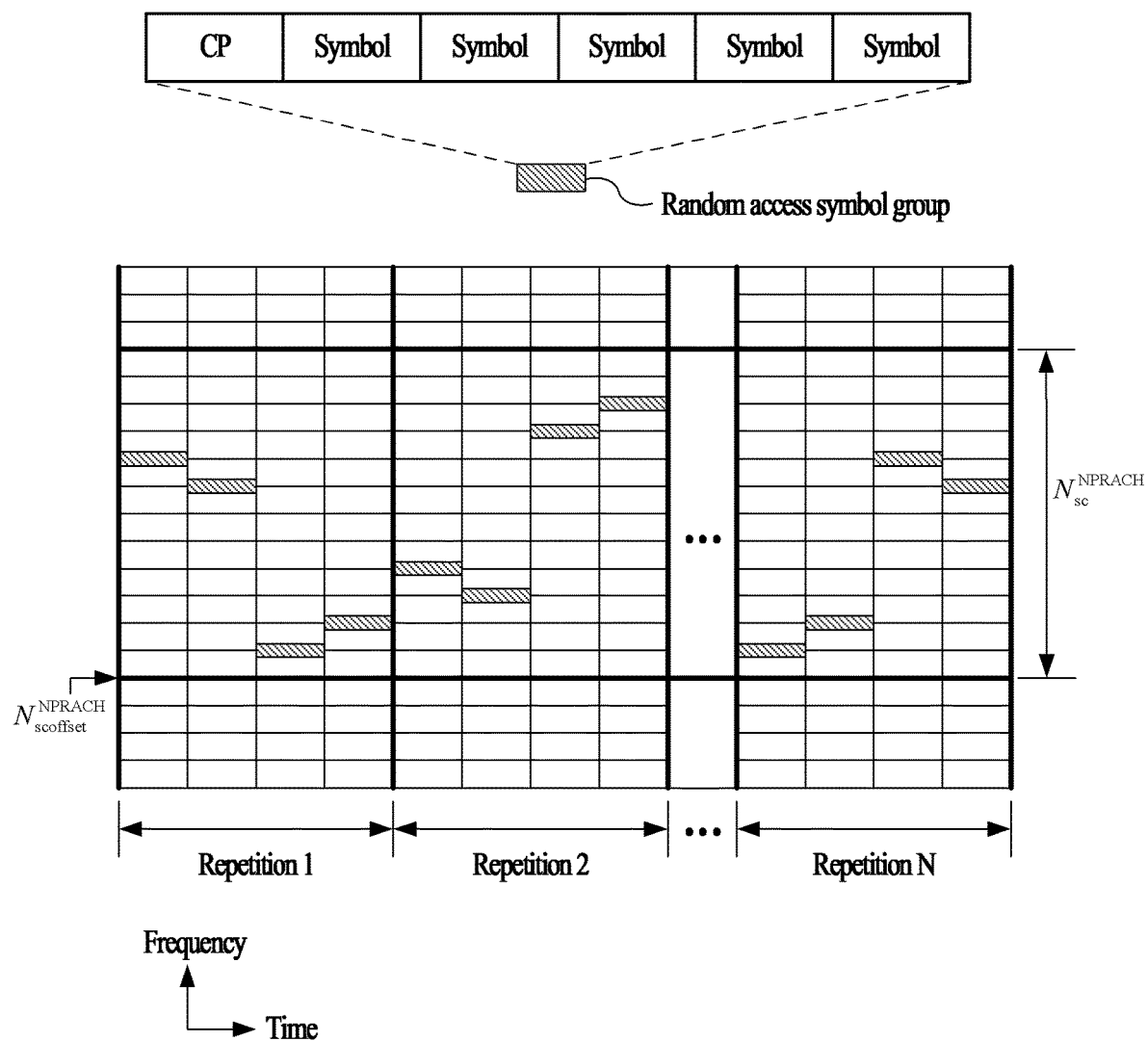
FIG. 6 illustrates an NPRACH preamble transmission method.

FIG. 6 illustrates an NPRACH preamble transmission method. The NPRACH preamble refers to a PRACH preamble for NB-IoT supported by the LTE-A Pro system and may be collectively referred to as a PRACH preamble. The random access symbol group of FIG. 6 may be referred to as an (N)PRACH symbol group, or simply as a symbol group.

The NPRACH preamble may be composed of four symbol groups (symbol group 0 to symbol group 3), and each symbol group may be composed of a cyclic prefix (CP) and a sequence part as illustrated in FIG. 6. The sequence part may consist of five subblocks, each of the subblocks including the same symbol. For example, the same symbol may have a fixed symbol value of 1.

The NPRACH preamble may be transmitted within a designated frequency region. The frequency region may be determined by a subcarrier offset (e.g., $N_{scoffset}^{NPRACH}$) and the number of subcarriers (e.g., $N_{sc}^{NPRACH}$) configured through a higher layer signal (e.g., an RRC layer signal) or system information (e.g., SIB2). Each symbol group constituting the NPRACH preamble is transmitted without a gap, and frequency hopping is performed in each symbol group within the designated frequency region. In frequency hopping, the frequency position of the (i+1)-th symbol group (i.e., symbol group i, where i=0, 1, 2, 3) is denoted by $n_{sc}^{RA}(i)$ and may be determined by Equation 1.

$$n_{sc}^{RA}(i)=n_{start}+\tilde{n}_{sc}^{RA}(i) \quad \text{[Equation 1]}$$

In Equation 1, $n_{start}$ denotes a start subcarrier index of the NPRACH preamble and is determined by Equation 2. In Equation 1, $\tilde{n}_{sc}^{RA}(i)$ denotes a subcarrier offset and is determined by Equation 3. In Equation 2, $N_{sc}^{RA}=12$ may be given.

$$n_{start} = N_{scoffset}^{NPRACH} + \lfloor n_{init}/N_{sc}^{RA} \rfloor \cdot N_{sc}^{RA} \quad \text{[Equation 2]}$$

$$\tilde{n}_{sc}^{RA}(i) = \quad \text{[Equation 3]}$$

$$\begin{cases} (\tilde{n}_{sc}^{RA}(0) + f(i/4))\bmod N_{sc}^{RA} & i \bmod 4 = 0 \text{ and } i > 0 \\ \tilde{n}_{sc}^{RA}(i-1) + 1 & \begin{array}{l} i \bmod 4 = 1, 3 \text{ and} \\ \tilde{n}_{sc}^{RA}(i-1) \bmod 2 = 0 \end{array} \\ \tilde{n}_{sc}^{RA}(i-1) - 1 & \begin{array}{l} i \bmod 4 = 1, 3 \text{ and} \\ \tilde{n}_{sc}^{RA}(i-1) \bmod 2 = 1 \end{array} \\ \tilde{n}_{sc}^{RA}(i-1) + 6 & \begin{array}{l} i \bmod 4 = 2 \text{ and} \\ \tilde{n}_{sc}^{RA}(i-1) < 6 \end{array} \\ \tilde{n}_{sc}^{RA}(i-1) - 6 & \begin{array}{l} i \bmod 4 = 2 \text{ and} \\ \tilde{n}_{sc}^{RA}(i-1) \geq 6 \end{array} \end{cases}$$

$$f(t) = \left(f(t-1) + \left(\sum_{n=10t+1}^{10t+9} c(n)2^{n-(10t+1)}\right)\bmod(N_{sc}^{RA} - 1) + 1\right)\bmod N_{sc}^{RA}$$

$$f(-1) = 0$$

In Equation 3, $\tilde{n}_{sc}^{RA}(0)$ denotes a subcarrier offset for symbol group 0 of the NPRACH preamble and is determined by Equation 4. In Equation 3, c(n) is determined by Equation 5. In Equation 4, $n_{init}$ is a value selected from {0, 1, . . . , $N_{sc}^{NPRACH}-1$}.

$$\tilde{n}_{sc}^{RA}(0)=n_{init} \bmod N_{sc}^{RA}, \quad \text{[Equation 4]}$$

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{[Equation 5]}$$

In Equation 5, $N_C=1600$, and $x_1(0)=1$, $x_1(n)=0$, n=1, 2, . . . , 30 may be given.

The NPRACH preamble may be repeatedly transmitted a specific number of times (e.g., N times in FIG. 6) for coverage enhancement or coverage extension. The specific number of repetitions may be configured through a higher layer signal (e.g., an RRC layer signal) or system information (e.g., SIB2). Four symbol groups constituting the NPRACH preamble (symbol group 0 to symbol group 3) are transmitted while hopping to a frequency position determined for each symbol group using Equations 1 to 5. After the first NPRACH preamble is transmitted in this way, each of the symbol groups of the second NPRACH preamble may also be transmitted through frequency hopping based on Equations 1 to 5. Using the same method, the NPRACH preamble may be repeatedly transmitted a specific number of times (e.g., N times). The frequency position of the first symbol group (i.e., symbol group 0) of each NPRACH preamble that is repeatedly transmitted may be randomly determined.

Since the symbol groups of the NPRACH preamble illustrated in FIG. 6 are transmitted without a gap, the guard time is not applied to the NPRACH preamble. Accordingly, for the NPRACH preamble illustrated in FIG. 6, a supported cell radius may be determined in consideration of the CP duration instead of the guard time. In general, the relationship between the cell radius and the round trip delay (RTD) may be represented by (Cell radius)=(Light speed)*(RTD/2), and the RTD corresponds to a guard time. Thus, the relationship between the cell radius and the CP duration may be represented by Equation 6.

$$\text{(Cell radius)}=\text{(Light speed)}*(CP \text{ duration}/2) \quad \text{[Equation 6]}$$

Table 1 exemplarily shows approximate values of the CP duration and cell radius according to the NPRACH preamble formats. As exemplarily shown in Table 1, the NPRACH preamble formats may include formats 0 and 1. The NPRACH preamble formats may have the same sequence length and different CP durations. The CP duration may be configured through a higher layer signal (e.g., an RRC layer signal) or system information (e.g., SIB2), and the corresponding NPRACH preamble format may be determined according to the CP duration. In Table 1, 'us' denotes microseconds and 'km' denotes kilometers.

TABLE 1

| Preamble format | CP duration (us) | Sequence (us) | GT duration (us) | Max. cell radius (km) |
|---|---|---|---|---|
| 0 | 67.5 | 1333.33 | N/A | 10.1 |
| 1 | 266.7 | 1333.33 | N/A | 40.0 |

In addition, a guard time (GT) may be given in consideration of an RTD according to the cell radius. For example, when a UE at the edge of a cell and a UE at the center of the cell transmit a PRACH preamble in the same TTI (e.g., subframe or slot), a guard time may be given to ensure that the base station can receive the PRACH preamble of each UE within the corresponding TTI. In general, since the relationship between the cell radius and the RTD may be represented by (Cell radius)=(Light speed)*(RTD/2) and the RTD corresponds to a guard time, the relationship between the cell radius and the guard time may be represented by Equation 7.

$$\text{(Cell radius)}=\text{(Light speed)}*(GT/2) \quad \text{[Equation 7]}$$

Table 2 exemplarily shows approximate values of the CP duration, GT duration, and cell radius according to the preamble formats of the legacy LTE/LTE-A system. In Table 2, the preamble format values are indicated by the PRACH configuration indexes. Preamble format 0 may be transmitted in one TTI (e.g., 1 ms), preamble formats 1 and 2 may be transmitted in two TTIs (e.g., 2 ms), and preamble format 3 may be transmitted in three TTIs (e.g., 3 ms). Here, denotes milliseconds. In Table 2, 'us' denotes microseconds and 'km' denotes kilometers.

TABLE 2

| Preamble format | CP duration (us) | GT duration (us) | Max. delay spread (us) | Max. cell radius (km) |
|---|---|---|---|---|
| 0 | 103.1 | 96.88 | 6.3 | 14.5 |
| 1 | 684.4 | 5156 | 16.7 | 77.3 |
| 2 | 203.1 | 196.9 | 6.3 | 29.5 |
| 3 | 684.4 | 715.6 | 16.7 | 100.2 |

As can be seen from Table 2, the maximum cell radius supported by the current LTE system is 100.2 km. Accordingly, in order to perform in-band operation using an LTE network, the UE for NB-IoT needs to support at least the same level of cell radius.

Figure 7:
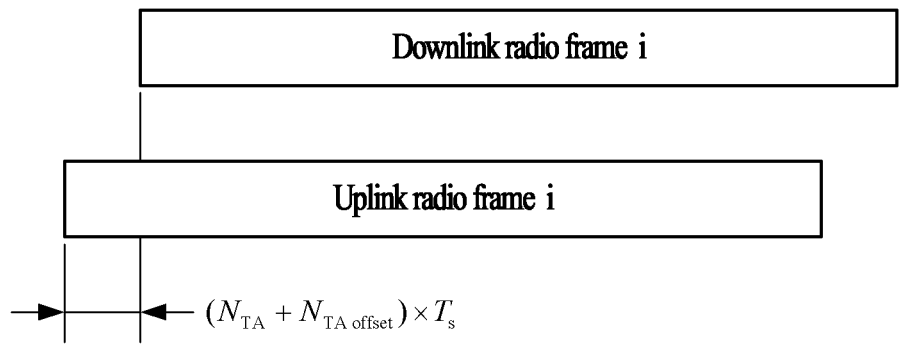
FIG. 7 illustrates an uplink-downlink timing relation.

FIG. 7 illustrates an uplink-downlink timing relation.

For uplink orthogonal transmission and reception, the base station may need to manage or adjust uplink transmission timing of each UE individually. Management or adjustment of transmission timing performed by the base station may be referred to as timing advance or timing alignment.

Timing advance or timing alignment may be performed through a random access procedure as described above. During the random access procedure, the base station may receive a random access preamble from the UE and calculate a timing advance value using the received random access preamble. The calculated timing advance value may be transmitted to the UE through a random access response, and the UE may update the signal transmission timing based on the received timing advance value. Alternatively, the base station may receive an uplink reference signal (e.g., a sounding reference signal (SRS)) that is periodically or randomly transmitted from the UE and calculate a timing advance, and the UE may update the signal transmission timing based on the calculated timing advance value.

As described above, the base station may measure the timing advance of the UE through a random access preamble or an uplink reference signal and may inform the UE of an adjustment value for timing alignment. In this case, the adjustment value for timing alignment may be referred to as a timing advance command (TAC) or a timing advance (TA) value.

Referring to FIG. 7, the transmission of uplink radio frame i from a UE may start $(N_{TA}+N_{TAoffset}) \times T_s$ seconds before the corresponding downlink radio frame starts, where $N_{TA}$ may be $0 \leq N_{TA} \leq 20512$, and $N_{TAoffset}$ may be 0 ($N_{TAoffset}=0$) for an FDD frame structure and 624 ($N_{TAoffset}=624$) for a TDD frame structure. $N_{TA}$ may be indicated by a TAC. $T_s$ denotes a sampling time. The uplink transmission timing may be adjusted in units of multiples of $16T_s$. The TAC may be given in 11 bits in the random access response and may indicate a value from 0 to 1282. $N_{TA}$ may be given as TA*16. Alternatively, the TAC may be given in 6 bits and indicate a value from 0 to 63. In this case, $N_{TA}$ may be given as $N_{TA,old}+(TA-31)*16$. The TAC received in subframe n may be applied to subframes, starting in subframe n+6.

As described above, the conventional NB-IoT system is designed based on the Global System for Mobile communications (GSM) network, which supports a cell radius of 35 km, and thus the cyclic prefix (CP) of the random access preamble is designed to support only cell radius of about 40 km. However, in order to support in-band operation in the LTE network, which is one of typical deployment scenarios of the NB-IoT system, it is necessary to support a cell radius of up to 100 km. In addition, the NB-IoT system includes a mobile autonomous reporting system at a place where humans are rare, that is, where the LTE network is not well equipped, and thus it is desirable to extend the supportable cell radius.

In order to extend the maximum supportable cell radius of the random access preamble, the CP and guard time (GT) of the (NPRACH) preamble may be generally extended. Additionally or alternatively, it may be considered to narrow the subcarrier spacing of the (NPRACH) preamble to suppress the increase in CP overhead. For example, in order to support a cell radius of 100 km, the CP duration may be determined as 666.7 us (see Equation 6). A CP extended to support the extended cell radius is referred to as an extended CP (E-CP). In addition, a time gap having the same duration (e.g., 666.7 us) as the E-CP may be needed to avoid a case where the random access preamble received from the UE overlaps with the next adjacent subframe from the base station perspective. This time gap is referred to as a guard time (GT).

Both the cyclic prefix and the guard time have been added to avoid interference between symbols. In other words, since the cyclic prefix and the guard time are additional signals added in terms of performance, they may be classified as overhead in terms of system throughput. Therefore, to ensure more efficient preamble transmission, it may be considered to reduce the percentage overhead (% overhead) of the cyclic prefix, and increase a portion (e.g., symbols or symbol group portion) corresponding to the preamble information except the cyclic prefix and the guard time.

As described with reference to FIG. 7, it is necessary for a base station to individually control uplink transmission timing of each UE for uplink orthogonal transmission and reception. This process is referred to as timing advance (TA) or timing alignment. Initial TA is performed through a random access procedure. In the NB-IoT system, when the UE transmits a random access preamble, the base station estimates an uplink transmission delay from the received preamble and transmits the uplink transmission delay to the UE through a random access response (RAR) message in the form of a TA command. The UE adjusts the transmission timing using the TA command received through the RAR message.

As described with reference to FIG. 6, the random access preamble (or NPRACH preamble) for NB-IoT is transmitted in a manner of single carrier frequency hopping, and is designed considering both the timing estimation acquisition range and accuracy. The subcarrier spacing of the conventional random access preamble (or NPRACH preamble) is designed to enable timing estimation without ambiguity within a cell radius of 40 km at 3.75 kHz. When timing estimation is to be performed using the spacing between two subcarriers, a supportable cell radius without ambiguity may be calculated as follows. In estimation using the spacing between two subcarriers, the phase difference between the signals transmitted on the two subcarriers may be represented as 2*pi*delta_f, and delta_f represents the subcarrier spacing in Hz (Hertz). In addition, a phase difference between the signals transmitted on two subcarriers in consideration of the RTD may be represented as 2*pi*delta_f*tau_RTT, where tau_RTT denotes an RTD. In order for the phase difference and the cell radius to have values satisfying a one-to-one correspondence relationship, 2*pi*delta_f*tau_RTT<2*pi should be satisfied. Thus, to ensure estimation without ambiguity, the relationship of tau_RTT<1/delta_f should be satisfied. The round trip distance is tau_RTT*(light speed)/2, where light speed=3E8 m/s. Accordingly, when the subcarrier spacing is 3.75 kHz, the cell radius is 1/delta_f*3E8/2=1/3.75 (kHz)*3E8 (m/s)/2=40 km. Since the cell radius within which timing estimation without ambiguity is allowed at 3.75 kHz subcarrier spacing of the legacy random access preamble (or NPRACH preamble) is 40 km, the subcarrier spacing should be narrowed to 1.5 kHz or less to support the cell radius of 100 km.

In summary, a cyclic prefix of a random access preamble needs to be extended to at least 666.7 us in order to support the cell radius of 100 km. A subcarrier spacing of a random access preamble needs to be reduced to 1.5 kHz or less to perform timing estimation without ambiguity, or timing estimation ambiguity needs to be resolved while maintaining a subcarrier spacing of 3.75 kHz.

The present disclosure is intended to enable the NB-IoT system to be used on the LTE network or a network supporting the maximum cell radius of the LTE system. Specifically, proposed herein is a method for improving a random access preamble (or NPRACH preamble) to allow a random access procedure for NB-IoT to be performed on the LTE network or a network supporting the maximum cell radius of the LTE system.

For simplicity, the random access preamble supporting the extended cell radius (e.g., 100 km) as proposed in the present disclosure is defined as an "enhanced" preamble, and the conventional random access preamble is referred to as a "legacy" preamble. In the present specification, the legacy preamble may be referred to as a first preamble format, and the enhanced preamble may be referred to as a second preamble format. In the present disclosure, the terms "random access preamble," "(N)PRACH preamble," "(N)PRACH signal" and "(N)PRACH" may be used interchangeably and may be referred to simply as a preamble. In the present disclosure, the terms "PRACH symbol group" and "random access symbol group" may be used interchangeably and may be referred to simply as a symbol group. In addition, a UE supporting the conventional NB-IoT (or the legacy preamble) may be referred to as a legacy UE, and a UE supporting the enhanced preamble (or both the legacy preamble and the enhanced preamble) may be referred to as an enhanced UE.

The present disclosure is described based on a user equipment/base station/system supporting NB-IoT, but the present disclosure is not limited thereto. The present disclosure may be also applied to a user equipment/base station/system that does not support NB-IoT communication in the same manner. For example, the present disclosure may be applied not only to user equipment/base station/system supporting massive machine type communication (mMTC) but also to typical user equipment/base station/system not supporting IoT and MTC. In the present specification, a user equipment/base station/system may collectively refer to a user equipment/base station/system supporting NB-IoT and a user equipment/base station/system not supporting NB-IoT.

Enhanced Preamble Format

In this specification, the enhanced preamble refers to a preamble designed to support a larger cell radius than the legacy preamble for NPRACH range enhancement by increasing the CP duration such that the preamble corresponds to a plurality of symbols compared to the conventional preamble, reducing the subcarrier spacing to 3.75/N kHz (where N is an integer greater than 1), applying symbol-level scrambling, and/or introducing symbol group level scrambling. The enhanced preamble may be a new type of PRACH format added to the existing legacy preamble.

Figure 8:
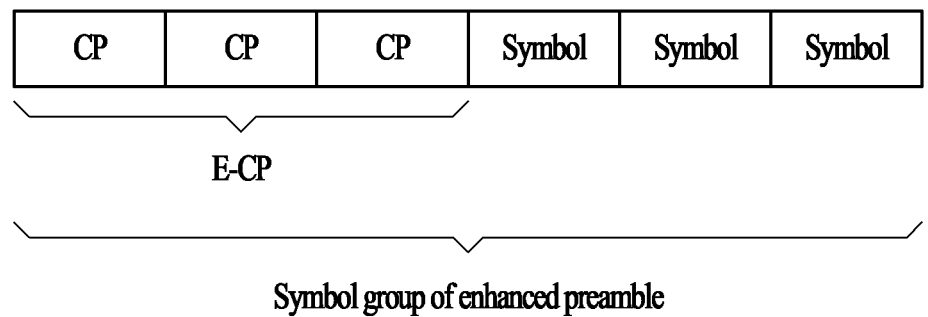
FIG. 8 to FIG. 10 illustrate enhanced preamble formats according to the present disclosure.

As an example of the enhanced preamble, the number of symbols used for the CP may be increased within a symbol group constituting a random access preamble (or NPRACH preamble) (e.g., see FIG. 6 and related description) for conventional NB-IoT. In the present disclosure, a CP corresponding to a plurality of symbols in a symbol group is referred to as an enhanced CP (E-CP). For example, to support an E-CP (>666.7 us), the first three symbols of the six symbols of the legacy preamble may be used as a CP and the three symbols may be used as a sequence part (see FIG. 8). In this example, the UE transmits a random access preamble in a format including a CP part corresponding to a 3-symbol duration and a sequence part corresponding to a 3-symbol duration, and the base station considers the first three symbols as an enhanced CP (E-CP), and performs preamble detection and timing estimation using the remaining three symbols other than the first three symbols. The random access preamble format of FIG. 8 is merely an example, and the present disclosure is not limited to the random access preamble format of FIG. 8.

As another example of the enhanced preamble, to support a cell radius of 100 km without ambiguity in timing estimation, the subcarrier spacing of the random access preamble (or NPRACH preamble) may be narrowed to 1.5 kHz or less. For example, the subcarrier spacing of the enhanced preamble may be configured to be 3.75/N kHz (where N is an integer greater than 1), taking into account additional delay spread and interference during FDM. More specifically, the subcarrier spacing may be configured to be 1.25 kHz (with N=3) to support up to the cell radius of 120 km. As such, by using a small subcarrier spacing for random access preamble (or NPRACH preamble) transmission, range enhancement may be achieved without ambiguity of timing estimation.

Figure 9:
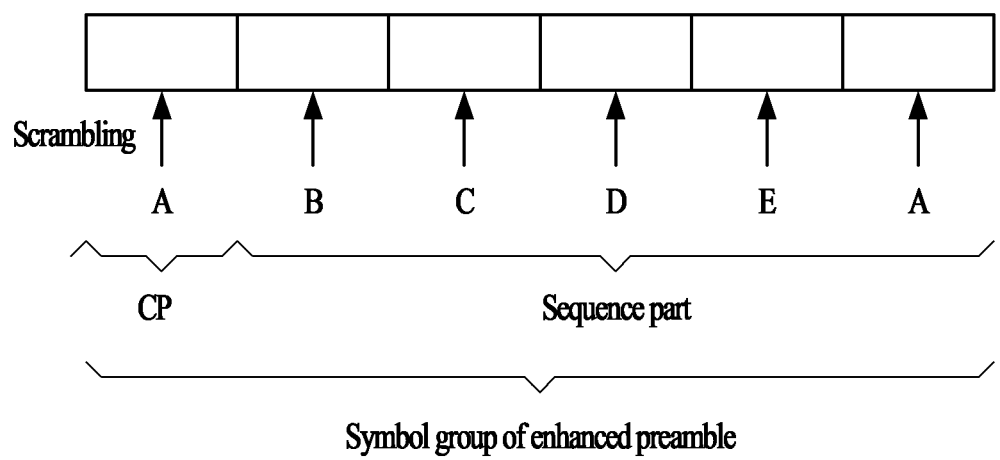

As another example of the enhanced preamble, symbol-level scrambling for each symbol group may be introduced in order to reduce the probability of false detection under inter-cell interference, or to increase the multiplexing capability (e.g., see FIG. 9). More specifically, a scrambling sequence of 'ABCDEA' 'FGHIJF' 'KLMNOK' 'PQRSTR' may be applied to each of the four symbol groups.

Figure 10:
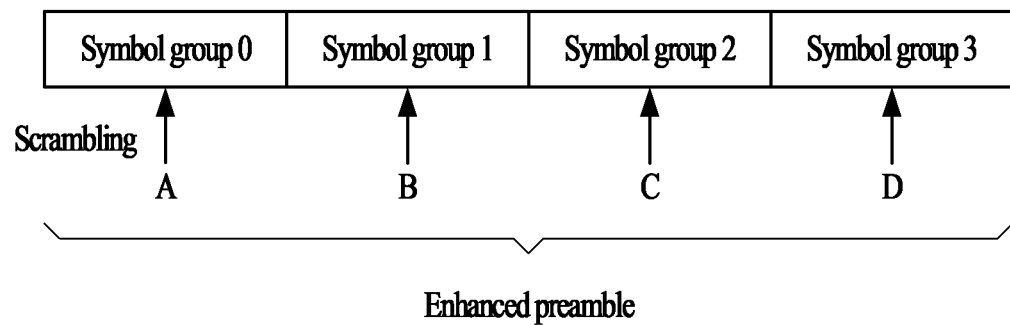

As another example of the enhanced preamble, symbol group-level scrambling may be applied to the random access preamble. In this case, a scrambling sequence of 'ABCD' may be applied to each symbol group for the random access preamble. In this case, the four symbol groups may be scrambled into 'AAAAAA' 'BBBBBB' 'CCCCCC' 'DDDDDD' (e.g., see FIG. 10).

In the present disclosure, an enhanced preamble may refer to one of the examples of the enhanced preamble described above or a combination of two or more thereof.

Method 1: Conditions and UE Operation for Msg1 Transmission

In Method 1 of the present disclosure, it is proposed that a UE transmit msg1 (or a random access preamble) in a cell supporting both the legacy preamble and the enhanced preamble. When the UE initially accesses a cell, the UE may acquires information about whether the cell supports the legacy preamble only, the enhanced preamble only, or both the legacy preamble and the enhanced preamble, through a higher layer signal (e.g., an RRC layer signal) or system information (e.g., SIB2). For a cell supporting only one of the legacy preamble and the enhanced preamble, the UE uses the preamble supported by the cell by utilizing the system information in reconnection. For a cell that supports both the legacy preamble and the enhanced preamble, it is proposed that the UE attempt initial msg1 (or random access preamble) transmission based on the following conditions.2

(1-i) When the reference signals received power (RSRP) is greater than or equal to a specific value (e.g., X), the UE does not use the E-CP. Alternatively, the UE does not start at least the initial msg1 (or random access preamble) transmission with the E-CP.

The RSRP threshold X may be one of RSRP thresholds for determining a legacy CE level, or may be a value configured in consideration of the transmission power of the base station, the distance to the base station, and other signal attenuation factors. For example, if the transmission power of the base station is 43 dBm as in LTE, and the sum of signal attenuation values is −176 dB, X may be configured to be −133 dBm.

(1-ii) If the configured repetition level is lower than or equal to a specific value (e.g., Y), the E-CP is not used. Alternatively, the UE does not start at least the initial msg1 (or random access preamble) transmission with the E-CP.

The repetition level threshold Y may be a repetition level value corresponding to X (e.g., −133 dBm). For example, it may be a repetition level value (e.g., Y=64 or 128) that supports a maximum coupling loss (MCL) corresponding to X (e.g., −133 dBm).

(1-iii) If the enhanced coverage level is lower than or equal to a certain value (e.g., Z), the E-CP is not used. Alternatively, the UE does not start at least the initial msg1 (or random access preamble) transmission with the E-CP.

The enhanced coverage level threshold Z may be the second greatest one of the supported enhanced coverage level values. For example, when enhanced coverage level=0, 1, 2 is supported, Z may be 1. In this case, only when the enhanced coverage level is 2, the E-CP may be supported or the enhanced preamble may be allocated.

(1-iv) The E-CP is not used if msg3 multi-tone transmission conditions are met (which is supported only when the number of repetitions <32), or to ensure msg3 multi-tone transmission. Alternatively, the UE does not start at least the initial msg1 transmission with the E-CP.

X, Y, and Z are all values corresponding to thresholds, and may be determined through experiments. The condition above is that the UE is not determined to be a cell edge UE and the E-CP is not used if the strength of the received signal is high (i.e., the RSRP is high), the repetition level is low, and/or the enhanced coverage level is low.

FIG. 11 illustrates a random access preamble transmission method according to the present disclosure. Although the method illustrated in FIG. 11 is described from the UE perspective, an operation corresponding thereto may be performed by a base station.

In step S1102, the UE may receive (N)PRACH configuration information from the base station. The (N)PRACH configuration information may be received through an higher layer signal (e.g., an RRC layer signal) or system information (e.g., SIB2) in initially accessing a cell. In addition, the (N)PRACH configuration information may include information indicating whether the cell supports only the legacy preamble (or a first preamble format), only the enhanced preamble (a second preamble format), or supports both the legacy preamble and the enhanced preamble.

In step S1104, the UE may transmit a random access preamble (or (N)PRACH preamble) to the base station based on the received (N)PRACH configuration information. For example, when only the legacy preamble is supported according to the (N)PRACH configuration information, the UE may perform random access preamble transmission using the legacy preamble (or the first preamble format). Alternatively, when only the enhanced preamble is supported according to the (N)PRACH configuration information, the UE may perform random access preamble transmission using the enhanced preamble (or the second preamble format) according to the present disclosure. Alternatively, when both the legacy preamble and the enhanced preamble are supported according to (N)PRACH configuration information, the UE may use the legacy preamble to perform random access preamble transmission when specific condition according to Method 1 of the present disclosure is met, and use the enhanced preamble to perform the random access preamble transmission when the specific condition is not met.

The specific condition may include at least one of the conditions (1-i) to (1-iv) described in Method 1 of the present disclosure. For example, the specific condition may include a condition that the RSRP is greater than or equal to a first value (e.g., X), a condition that the configured repetition level is lower than or equal to a second value (e.g., Y), a condition that the enhanced coverage level is lower than or equal to a third value (e.g., Z), and/or a condition that the Msg3 multi-tone transmission condition is satisfied (or the number of repetitions <32).

In a cell supporting both the legacy preamble and the enhanced preamble or a cell supporting only the enhanced preamble, the enhanced NPRACH resource may not be configured from enhanced coverage level 0. Alternatively, the enhanced NPRACH resource may be configured from the highest enhanced coverage level. That is, the enhanced NPRACH resource may be generated first at the highest enhanced coverage level in the cell or carrier. That is, when one CE level is configured, the enhanced preamble may be defined only at the highest enhanced coverage level. This may be intended to allocate an enhanced NPRACH resource preferentially to a UE at the cell edge (i.e., a UE having a low RSRP, a high repetition level, or a high enhanced coverage level).

Method 2: Contention Resolution Method Used when the Legacy Preamble UE Collides with the Enhanced Preamble UE As connection density increases in a cell, it may be difficult to independently allocate NPRACH time/frequency resources. In Method 2 of the present disclosure, it is proposed that contention resolution be performed using the following methods when a collision occurs while the legacy UE and the enhanced UE share NPRACH resources.

(2-i) The legacy UE and a UE supporting the enhanced preamble use different RA-RNTIs.

Method (2-i) is to assign different RA-RNTIs to the legacy UE and the UE supporting the enhanced preamble such that the UE that the RAR message is intended for is identified. Alternatively, method (2-i) is to use different RA-RNTIs for the legacy preamble (or the first preamble format) and the enhanced preamble (or the second preamble format).

For the legacy UE (or the legacy preamble), the RA-RNTI may be determined based on index information about the first (or starting) radio frame in which repeated transmission of the random access preamble starts. As a specific example, the legacy UE may determine the RA-RNTI based on Equation 8. In Equation 8, SFN_id denotes index information about the first (or starting) radio frame in which repeated transmission of the random access preamble starts, and floor( ) denotes a floor function that rounds a number to the nearest integer. The legacy UE detects the PDCCH using the RA-RNTI determined in this way and receives an RAR message based on the detected PDCCH.

$$RA\text{-RNTI}=1+\text{floor}(SFN\_id/4) \quad \text{[Equation 8]}$$

The RA-RNTI for the enhanced UE (or enhanced preamble) may be determined by adding a specific offset to the RA-RNTI obtained based on Equation 8 so as to be distinguished from the RA-RNTI of the legacy UE. For example, in method (2-i) of the present disclosure, the RA-RNTI for the enhanced UE may be determined by adding a certain offset (e.g., an integer greater than 1) to Equation 8. In this case, even when the legacy UE and the enhanced UE start random access preamble transmission in the same radio frame, the RA-RNTI value for the legacy UE and the RA-RNTI value for the enhanced UE are determined differently. Therefore, when the random access preamble of the legacy UE collides with the random access preamble of the enhanced UE, contention resolution may be effectively performed.

(2-ii) After using the same RA-RNTI, the UEs are distinguished from each other by the RAR message header.

Method (2-ii) is to perform contention resolution by assigning the same RA-RNTI to the legacy UE and the UE supporting the enhanced preamble, and transmitting distinguishable information in the payload or header of the RAR message. Alternatively, method (2-ii) is to perform contention resolution by using the same RA-RNTI for the legacy preamble (or the first preamble format) and the enhanced preamble (or the second preamble format) and transmitting information that distinguishes between the legacy preamble and the enhanced preamble, through an RAR message header or payload.

FIGS. 12(a) and 12(b) illustrate an RAR message header for a legacy UE. FIG. 12(a) shows an RAR message header of a type including a random access preamble identifier (RAPID), and FIG. 12(b) shows an RAR message of a type including a backoff indicator (BI). In FIGS. 12(a) and 12(b), E represents an extension field, indicates whether there is another field thereafter and may have a value of 1. T represents a type field. If the value thereof 1, this indicates the RAR header of FIG. 12(a). If the value is 0, this indicates the RAR header of FIG. 12(b). BI represents a backoff indicator field and indicates an overload condition of a cell. RAPID represents a random access preamble identifier field and identifies a random access preamble transmitted by the UE. R represents a reserved bit and is configured to be 0.

The enhanced UE may be distinguished from the legacy UE by configuring the reserved bit R to be 1 in the RAR header of FIGS. 12(a) and 12(b). Alternatively, in FIG. 12(a), the enhanced UE may be distinguished from the legacy UE by configuring RAPID to be a value corresponding to the sum of a subcarrier index at which random access preamble transmission is started and a specific offset (e.g., an integer greater than 1).

FIG. 12(c) illustrates an RAR message payload for a legacy UE. R represents a reserved bit and is configured to be 0. Timing Advance Command represents a TA command field and includes a TA command (see FIG. 7 and related description). UL Grant represents an uplink grant field and includes uplink grant information for Msg3 transmission. Temporary C-RNTI represents a temporary C-RNTI field and includes a temporary C-RNTI (or TC-RNTI) used for reception of Msg4.

The enhanced UE may be distinguished from the legacy UE by configuring the reserved bit of FIG. 12(c) to be 1.

Method 3: Transmission and Retransmission of Msg1 for NPRACH Range Enhancement

A UE supporting the enhanced preamble may fail to transmit msg1 due to the following two causes.

(3-i) Insufficient CP (3-ii) More repetition required due to insufficient useful symbol energy In consideration of the two causes, it is proposed that the UE attempt transmission and retransmission using the following methods.

Method 3-1: Legacy Preamble-First Attempt

In Method 3-1, the UE first attempts random access preamble transmission using the legacy preamble. If the random access preamble transmission using the legacy preamble fails until the maximum counter value (and/or the maximum transmit power and/or the maximum number of repetitions) is reached, random access preamble transmission is performed using the enhanced preamble. If the CP duration of the enhanced preamble is increased compared to the legacy preamble, it may be more effective to use the legacy preamble first in terms of (3-ii) because the legacy preamble may provide larger useful symbol energy than the enhanced preamble.

Figure 13:
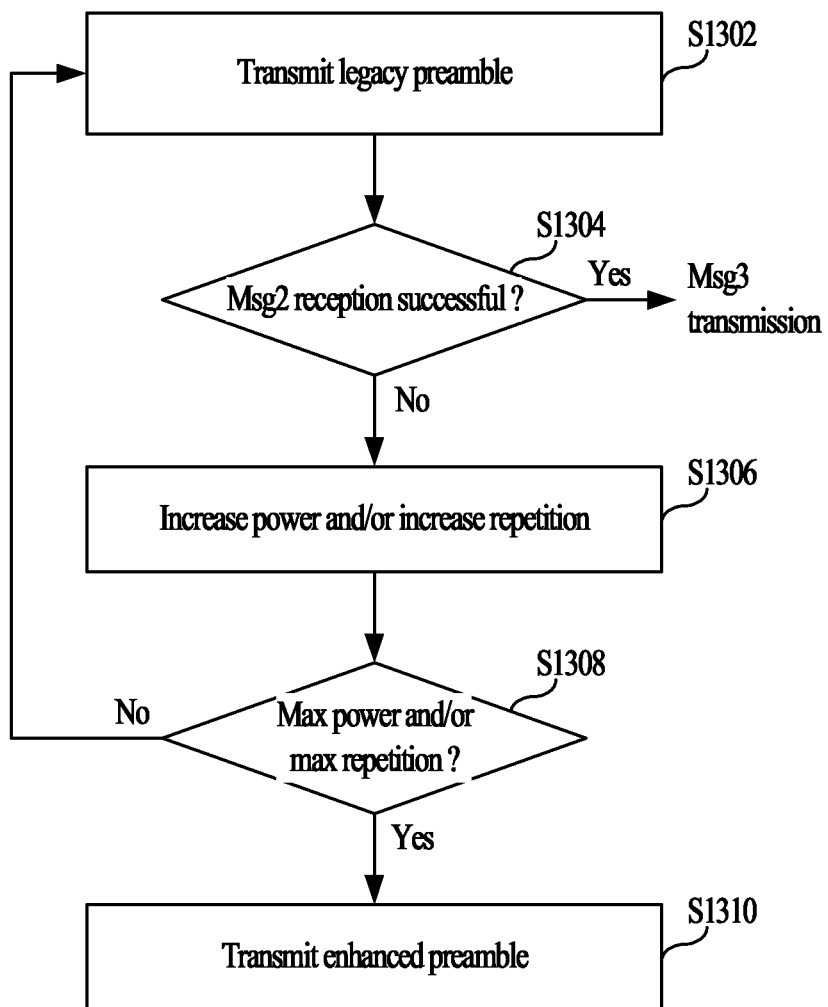
FIG. 13 and FIG. 14 illustrate methods of retransmitting a random access preamble according to the present disclosure.

FIG. 13 is a flowchart illustrating Method 3-1 of the present disclosure. As illustrated in FIG. 13, Method 3-1 may perform random access preamble transmission in the following order.

* Legacy preamble transmission (msg1) (step S1302)→Msg2 reception failed (step S1304)→Counter value increment, and/or power ramping, and/or increase repetition (step S1306)→legacy preamble transmission (msg1) (step S1302)→ . . . →Msg2 reception failed (step S1304)→If the maximum counter value (and/or maximum transmit power and/or maximum number of repetitions) is reached (step S1308), enhanced preamble transmission (step S1310)

Method 3-2: Enhanced Preamble-First Attempt

In Method 3-2, the UE first attempts random access preamble transmission using the enhanced preamble. When the random access preamble transmission using the enhanced preamble fails until the maximum transmission power and/or the maximum repetition number is reached, the UE performs random access preamble transmission using the legacy preamble. Since the enhanced preamble may provide wider coverage than the legacy preamble, it may be more effective to use the enhanced preamble first from the perspective of (3-i).

Figure 14:
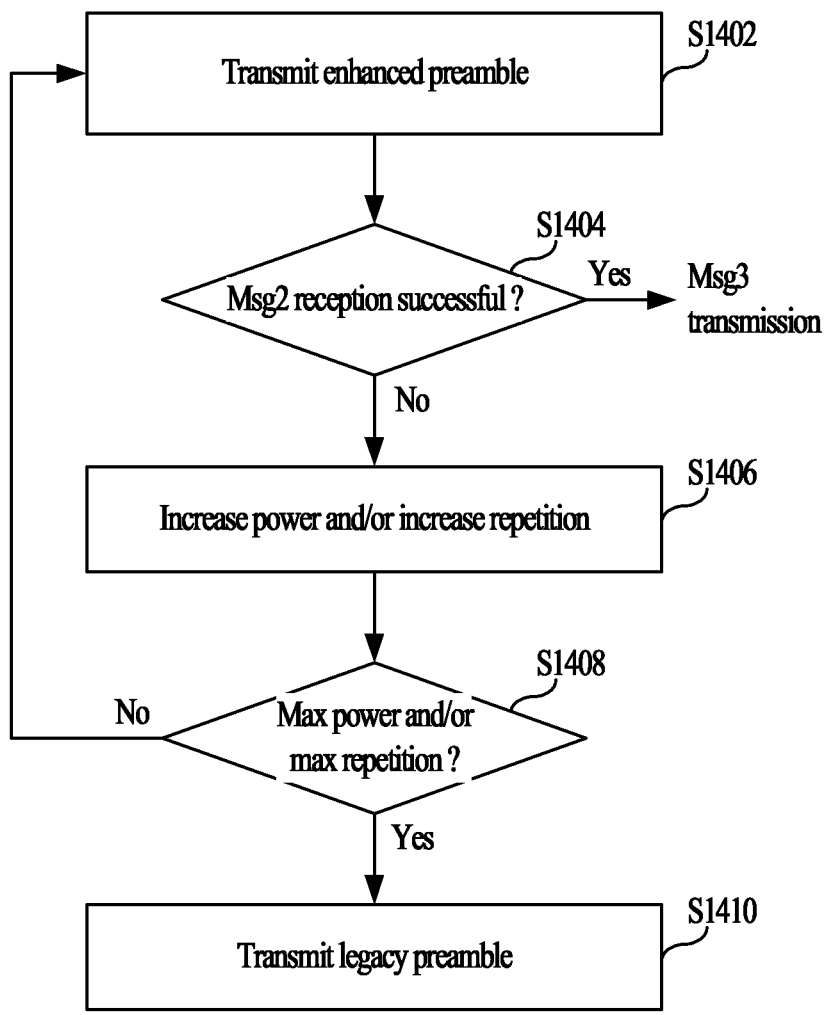

FIG. 14 is a flowchart illustrating Method 3-2 of the present disclosure. In Method 3-2 as illustrated in FIG. 14, random access preamble transmission may be performed in the following order.

* Enhanced preamble transmission (msg1) (step S1402)→msg2 reception failed (step S1404)→counter value increment, and/or power ramping, and/or increase repetition (step S1406)→enhanced preamble transmission (msg1) (step S1402)→ . . . →Msg2 reception failed (step S1404)→when the maximum counter value (and/or the maximum transmit power and/or the maximum repetition number) is reached (step S1408), legacy preamble transmission (step S1410)

Method 3-3: Legacy Preamble-First Alternating Attempt

In Method 3-3, transmission with the legacy preamble is first attempted. When the Msg2 reception fails, the enhanced preamble and the legacy preamble are alternatingly transmitted until the maximum counter value (and/or the maximum transmit power and/or the maximum repetition number) is reached. Method 3-3 considers the causes (3-i) and (3-ii) simultaneously, but prioritizes the cause (3-ii).

In Method 3-3, random access preamble transmission may be performed in the following order.

* Legacy preamble transmission (msg1) (step S1502)→Msg2 reception failed (step S1504)→enhanced preamble transmission by increment of the counter value, and/or power ramping, and/or increase of repetition, or without increment of the counter value, and/or power ramping, and/or increase of repetition (step S1506)→Msg2 reception failed (step S1508)→legacy preamble transmission (msg1) by increment of the counter value, and/or power ramping, and/or increase of repetition, or without increment of the counter value, and/or power ramping, and/or increase of repetition (step S1510)→repeat steps S1504 to S1510 until the maximum counter value (and/or the maximum transmit power and/or the maximum repetition number) is reached.

Method 3-4: Enhanced Preamble-First Alternating Attempt

In Method 3-4, transmission with the enhanced preamble is first attempted. When Msg2 reception fails, the enhanced preamble and the legacy preamble are alternatingly transmitted until the maximum counter value (and/or the maximum transmit power and/or the maximum repetition number) is reached. Method 3-4 considers the causes (3-i) and (3-ii) simultaneously, but prioritizes the cause (3-i).

In Method 3-4, random access preamble transmission may be performed in the following order.

* Enhanced preamble transmission (msg1) (step S1602)→Msg2 reception failed (step S1604)→enhanced preamble transmission by increment of the counter value, and/or power ramping, and/or increase of repetition, or without increment of the counter value, and/or power ramping, and/or increase of repetition (step S1606)→Msg2 reception failed (step S1608)→legacy preamble transmission (msg1) by increment of the counter value, and/or power ramping, and/or increase of repetition, or without increment of the counter value, and/or power ramping, and/or increase of repetition (step S1610)→repeat steps S1604 to S1610 until the maximum counter value (and/or the maximum transmit power and/or the maximum repetition number) is reached.

In Methods 3-1 to 3-4 of the present disclosure, when the legacy preamble and the enhanced preamble take different PRACH formats, Methods 3-1 and 3-2 are to perform retransmission until the maximum counter value is reached by increasing the counter value for one (N)PRACH (or random access preamble) format and then change the format to the other format, and Methods 3-3 and 3-4 are to alternatingly perform retransmission until the maximum counter value is reaches by increasing the counter value for the different formats. In other words, when Msg2 reception fails, Methods 3-1 and 3-2 includes incrementing the counter value for one (N)PRACH (or random access preamble) format, retransmitting the random access preamble using the same preamble format as the previously transmitted preamble format when the incremented counter value is less than the maximum counter value, and retransmitting the random access preamble using a preamble format different from the previously transmitted preamble format when the incremented counter value is equal to the maximum counter value. On the other hand, when Msg2 reception fails, Method 3-3 and Method 3-4 include retransmitting the random access preamble using a preamble format different from the previously transmitted preamble format.

In Methods 3-1 to 3-4, the maximum counter value may be a value configured for each UE (or a UE-specifically configured value) or a value configured for each format (or random access preamble format-specifically configured value). Additionally or alternatively, in Methods 3-1 to 3-4, power ramping or increase of the repetition may be independently performed for each format. As an example, independent counters may be operated for the formats of the legacy preamble and the enhanced preamble. As another example, the legacy preamble and the enhanced preamble may be operated in association with each format. In the latter case, in the format switching, for example, the operation may be performed by configuring a counter value of the new format in consideration of or based on the power ramping or repetition increase value of the previous format, or a value subsequent to the counter value of the previous format may be received and apply to the new format. Alternatively, one counter value may be applied to the formats of the legacy preamble and the enhanced preamble in common.

Method 3 may be implemented in combination with Method 1. For example, a UE supporting both the legacy preamble and the enhanced preamble together may select one of the four msg1 transmission and retransmission methods (Methods 3-1 to 3-4) in consideration of the conditions and UE operation in msg1 transmission as proposed in Method 1. In this case, the UE may inform the base station of the method selected by the UE through the NPRACH resource. The NPRACH resource includes an allocated time/frequency region (including the starting subcarrier position) and a sequence. Alternatively, a method to be used among Methods 3-1 to 3-4 may be configured by the base station by higher layer signaling.

Method 4: Timing Correction and Reconfirmation Through Msg3 for NPRACH Range Enhancement To ensure uplink orthogonal transmission and reception, the base station needs to individually control the uplink transmission timing of each UE. This process is called timing advance (TA) and initial TA is performed through a random access procedure (e.g., see FIG. 7 and related description). The process of performing initial uplink synchronization using a random access procedure in NB-IoT is carried out as follows.

(4-i) The UE transmits a random access preamble.

(4-ii) After performing timing estimation from the received preamble, the base station transmits a TA command to the UE on downlink through a random access response (RAR) message.

(4-iii) The UE adjusts initial uplink transmission timing using the TA command.

(4-iv) Upon completion of the initial uplink synchronization, the UE transmits a UE ID along with an RRC connection/resume request through msg3 and checks the UE ID thereof through msg4 to confirm contention resolution.

The base station may reconfirm, modify, or correct the timing estimate through msg3 through which the initial uplink synchronization is completed. The base station attempts to decode all TA candidate values of msg3 and delivers TA command/confirm/adjustment information to the UE through msg4. The UE may readjust the timing or confirm that the timing estimation is correct, through the TA command/confirm/adjustment information.

For the random access preamble of NB-IoT, a single carrier frequency hopping technique is used, which is designed considering both the timing estimation acquisition range and accuracy. The subcarrier spacing of the conventional random access preamble (or legacy preamble) is designed to enable timing estimation without ambiguity for a cell radius of up to 40 km at 3.75 kHz. However, when the enhanced preamble is designed with the same subcarrier spacing of 3.75 kHz, timing estimation ambiguity should be resolved to support the cell radius of 100 km. When timing estimation is performed through the legacy preamble having the subcarrier spacing of 3.75 kHz, for example, 20 km, 60 km, and 100 km are determined to be TA values corresponding to the same 20 km. As in this example, TA values corresponding to different coverages (or cell radiuses) are referred to as TA candidate values. In this example, there are three TA candidate values consisting of a TA value corresponding to the coverage (or cell radius) of 20 km, a TA value corresponding to the coverage (or cell radius) of 60 km, and a TA value corresponding to the coverage (or cell radius) of 100 km. One of the TA candidate values is determined as an actual TA value. In Method 4 of the present disclosure, the following methods may be used to estimate the actual TA value.

Method 4-1: The Base Station Performs Hypothesis Testing on all TA Candidate Values (No Msg3 Retransmission Required).

In Method 4-1, the base station attempts to decode the TA candidate values and then signals and then informs the UE of a TA candidate value which has been successfully decoded through msg4. If the base station succeeds in decoding a plurality of TA candidate values, the base station selects the most reliable TA candidate value (e.g., a TA candidate value corresponding to the largest coverage) based on a predetermined criterion and transmits the same to the UE through msg4. The UE may confirm success of msg4 reception through information such as a UE ID included in msg4 and apply a TA value indicated through msg4 to subsequent uplink transmission.

Method 4-2: The UE retransmits msg3 by changing the TA candidate values.

In Method 4-2, the UE transmits msg3 using one of the TA candidate values. Then, if it fails to receive msg4, the UE retransmits msg3 using another one of the TA candidate values. The UE may perform msg3 retransmission using the remaining TA candidate values until the msg4 reception is successful.

When TA candidate values are TA1, TA2, and TA3, Method 4-2 operates in the following order. If the UE fails to receive msg4 corresponding to msg3 transmitted with TA1, the UE retransmits msg3 with TA1 N1 times→The UE retransmits msg3 with TA2 N2 times.→The UE retransmits msg3 with TA3 N3 times. If it still fails in the reception, the UE may repeat the operations from the msg1 transmission step. N1, N2 and N3 are integers greater than 1 and may be configured independently. In this method, repeated transmission is performed with the same TA first. However, if the TA value is incorrect and thus the base station cannot receive msg3, an excessive delay may be produced.

To compensate for this method, retransmission may be performed by changing the TA candidate value first. If the UE transmits msg3 through TA1 and then fails to receive msg4 corresponding to the transmitted msg3, the UE performs retransmission in order of TA2 transmission and TA3 transmission. The process of TA1 transmission→TA2 transmission→TA3 transmission may be repeated N times. Here, N may be configured to be an integer greater than 1.

After msg3 is (re)transmitted using one of the two methods above, the correct TA value is calculated. Then, the correct TA value is used from the subsequent uplink transmission (e.g., HARQ-ACK transmission for msg4). To this end, the correct TA information may be indicated by the UL grant DCI included in msg4.

Method 5: Procedure by PDCCH Order

The PDCCH order is a method of allowing the UE to perform random access procedure according to determination of the base station in the connected (e.g., RRC-CONNECTED) state. The PDCCH order refers to indicating initiation of the random access procedure on the PDCCH. Since the base station and the UE know whether the UE used the legacy preamble or the enhanced preamble in the recent random access procedure, the UE may basically use the recently used preamble. However, when necessary, whether the UE selects the legacy preamble or the enhanced preamble may be specified and signaled according to determination of the base station. When the UE receives an (N)PDCCH order, the UE additionally checks a preamble designation value and starts the random access procedure using the legacy preamble or the enhanced preamble.

Figure 15:
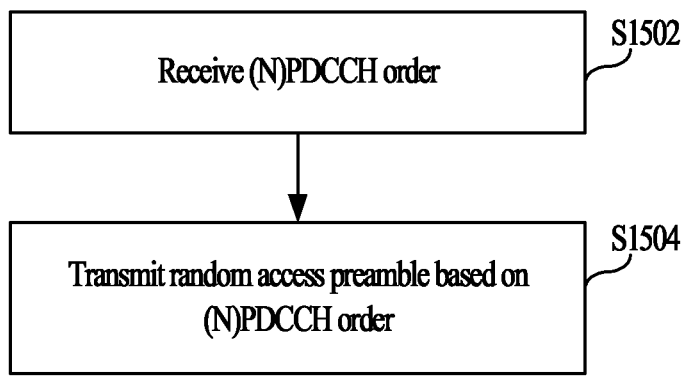
FIG. 15 illustrates a method of transmitting a random access preamble according to the present disclosure.

FIG. 15 illustrates a random access preamble transmission method according to Method 5. Although the method illustrated in FIG. 11 is described from the UE perspective, an operation corresponding thereto may be performed by a base station.

In step S1502, the UE may receive an (N)PDCCH order from the base station. Specifically, the UE may receive downlink control information (DCI) corresponding to the (N)PDCCH order on the (N)PDCCH. The DCI may include information indicating the legacy preamble or the enhanced preamble.

In step S1504, the UE may transmit a random access preamble based on the (N)PDCCH order. If the information included in the DCI indicates the legacy preamble, the UE may perform random access preamble transmission using the legacy preamble format. If the information included in the DCI indicates the enhanced preamble, the UE may perform random access preamble transmission using the enhanced preamble format.

Method 1 or 5 of the present disclosure may be performed in combination with at least one of Methods 2 to 4. For example, after the random access preamble is transmitted according to Method 1 or 5 of the present disclosure, Method 2 of the present disclosure may be carried out to receive an RAR message. Additionally or alternatively, if RAR message (or Msg2) reception fails after transmitting the random access preamble according to Method 1 or 5, Method 3 of the present disclosure may be carried out. Additionally or alternatively, after the random access preamble is transmitted according to Method 1 or 5 of the present disclosure and the RAR message (or Msg2) is received, Method 4 of the present disclosure may be carried out for uplink timing correction/readjustment.

Figure 16:
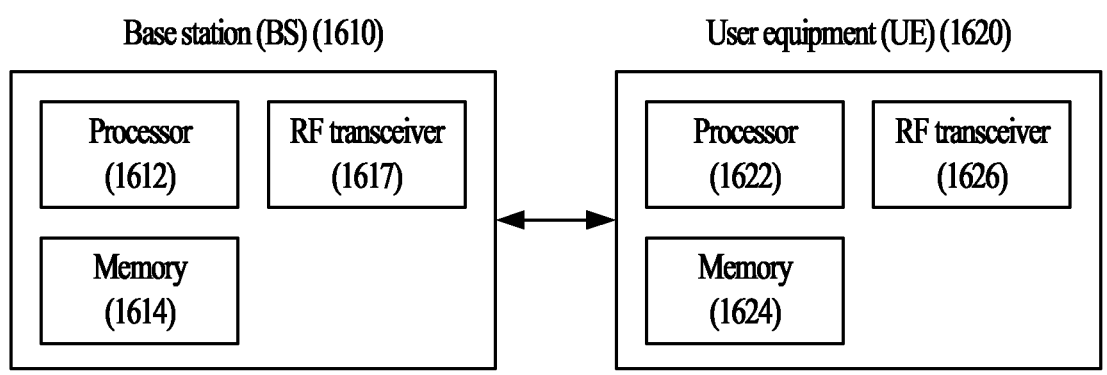
FIG. 16 illustrates a base station and a user equipment to which the present disclosure is applicable.

FIG. 16 illustrates a base station and a user equipment to which the present disclosure is applicable.

Referring to FIG. 16, a wireless communication system includes the base station (BS, 1610) and the user equipment (UE, 1620). When the wireless communication system includes a relay, the base station or the user equipment may be replaced with the relay.

The base station 1610 includes a processor 1612, a memory 1614, and a radio frequency (RF) transceiver 1616. The processor 1612 may be configured to embody the procedures and/or methods proposed by the present disclosure. The memory 1614 is connected to the processor 1612 and stores various pieces of information associated with an operation of the processor 1612. The RF transceiver 1616 is connected to the processor 1612 and transmits/receives a radio signal. The UE 1620 includes a process 1622, a memory 1624, and an RF transceiver 1626. The processor 1622 may be configured to embody the procedures and/or methods proposed by the present disclosure. The memory 1624 is connected to the processor 1622 and stores various pieces of information associated with an operation of the processor 1622. The RF transceiver 1626 is connected to the processor 1622 and transmits/receives a radio signal.

The embodiments of the present disclosure may be implemented by various means, for example, hardware, firmware, software, or a combination thereof. In a hardware implementation, an embodiment of the present disclosure may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, methods according to the present disclosure may be implemented in the form of a module, a procedure, a function, etc which are configured to perform the functions or operations as described in the present specification. Software code may be stored in a computer-readable medium in the form of instructions and/or data and may be executed by a processor. The computer-readable medium is located at the interior or exterior of the processor and may transmit and receive data to and from the processor via various known means.

It will be apparent to those skilled in the art that various modifications and variations can be made in the present disclosure without departing from the scope of the invention. Thus, it is intended that the present disclosure cover the modifications and variations of this invention provided they come within the scope of the appended claims and their equivalents.

INDUSTRIAL APPLICABILITY

The present disclosure is applicable to a wireless communication apparatus such as a user equipment (UE), a base station (B S), etc.

The invention claimed is:

1. A method for performing a random access procedure by a user equipment in a wireless communication system, the method comprising:
receiving downlink control information (DCI) including narrowband physical random access channel (NPRACH) format information; and
transmitting a random access preamble including a sequence part and a cyclic prefix (CP) part based on the NPRACH format information,
wherein the DCI including the NPRACH format information is a narrow band physical downlink control channel (NPDCCH) order configured to indicate either one of a first type preamble format or a second type preamble format,
wherein the first type preamble format is configured with a first sequence part and a first CP part, the first sequence part having 5 symbols and the first CP part being attached in front of the first sequence part,
wherein the second type preamble format is configured with a second sequence part and a second CP part, the second sequence part having 3 symbols and the second CP part being attached in front of the second sequence part, and
wherein the first CP part attached to the first sequence part with 5 symbols is shorter than the second CP part attached to the second sequence part with 3 symbols.

2. The method of claim 1, wherein the first type preamble format has a subcarrier spacing of 3.75 kHz, and the second type preamble format has a subcarrier spacing of 3.75/N kHz, and N is an integer greater than 1.

3. The method of claim 1, further comprising:
receiving a random access response message using a random access radio network temporary identifier (RA-RNTI),
wherein different RA-RNTIs are used for the first type preamble format and the second type preamble format.

4. The method of claim 1, further comprising:
receiving a random access response message using a random access radio network temporary identifier (RA-RNTI),
wherein the same RA-RNTI is used for the first type preamble format and the second type preamble format, and a header or payload of the random access response message contains information for distinguishing between the first type preamble format and the second type preamble format.

5. The method of claim 1, further comprising:
when a random access response message corresponding to the random access preamble fails to be received, retransmitting the random access preamble,
wherein retransmitting the random access preamble comprises:
increasing a counter value,
when the increased counter value is less than a maximum counter value, retransmitting the random access preamble using the same type preamble format as before, and
when the increased counter value is equal to the maximum counter value, retransmitting the random access preamble using a different type preamble format than before.

6. The method of claim 1, further comprising:
when a random access response message corresponding to the random access preamble fails to be received, retransmitting the random access preamble using a different type preamble format than before.

7. The method of claim 1, further comprising:
receiving a random access response message containing a first timing advance command;
transmitting a radio resource control (RRC) connection request message by applying the first timing advance command;
receiving a contention resolution message containing a second timing advance command; and
transmitting a hybrid automatic repeat and request acknowledgement (HARQ-ACK) signal for the contention resolution message by applying the second timing advance command.

8. The method of claim 1, further comprising:
receiving a random access response message containing a first timing advance command;
transmitting a radio resource control (RRC) connection request message by applying the first timing advance command;
when a contention resolution message corresponding to the transmitted RRC connection request message fails to be received, retransmitting the RRC connection request message by applying a second timing advance command; and
when a contention resolution message corresponding to the retransmitted RRC connection request message fails to be received, retransmitting the RRC connection request message by applying a third timing advance command.

9. A non-transitory medium readable by a processor and recorded thereon program codes for performing the method of claim 1.

10. The method of claim 1, wherein a total CP length of the first type preamble format is shorter than a total CP length of the second type preamble format in a time domain.

11. The method of claim 1, wherein the first type preamble format is a legacy preamble format than the second type preamble format.

12. The method of claim 11, wherein the legacy preamble format includes NPRACH format 0 and NPRCH format 1 defined in 3rd generation partnership project (3GPP)-based narrow band-internet of things (NB-IoT).

13. The method of claim 1, wherein the first type preamble format includes two preamble formats and the second type preamble format includes one preamble format.

14. A user equipment for performing a random access procedure in a wireless communication system, the user equipment comprising:
a radio frequency (RF) transceiver; and
a processor operatively connected to the RF transceiver, wherein the processor is configured to:
control the RF transceiver to receive downlink control information (DCI) including narrowband physical random access channel (NPRACH) format information, and
control the RF transceiver to transmit a random access preamble including a sequence part and a cyclic prefix (CP) part based on the NPRACH format information,
wherein the DCI including the NPRACH format information is a narrow band physical downlink control channel (NPDCCH) order configured to indicate either one of a first type preamble format, or a second type preamble format,
wherein the first type preamble format is configured with a first sequence part and a first CP part, the first sequence part having 5 symbols and the first CP part being attached in front of the first sequence part,
wherein the second type preamble format is configured with a second sequence part and a second CP part, the second sequence part having 3 symbols and the second CP part being attached in front of the second sequence part, and
wherein the first CP part attached to the first sequence part with 5 symbols is shorter than the second CP part attached to the second sequence part with 3 symbols.

15. A device for wireless communication, the device comprising:
a memory configured to store instructions; and
a processor configured to perform, by executing the instructions, operations including:
a reception of downlink control information (DCI) including narrowband physical random access channel (NPRACH) format information; and
a transmission of a random access preamble including a sequence part and a cyclic prefix (CP) part based on the NPRACH format information,
wherein the DCI including the NPRACH format information is a narrow band physical downlink control channel (NPDCCH) order configured to indicate either one of a first type preamble format or a second type preamble format,
wherein the first type preamble format is configured with a first sequence part and a first CP part, the first sequence part having 5 symbols and the first CP part being attached in front of the first sequence part,
wherein the second type preamble format is configured with a second sequence part and a second CP part, the second sequence part having 3 symbols and the second CP part being attached in front of the second sequence part, and
wherein the first CP part attached to the first sequence part with 5 symbols is shorter than the second CP part attached to the second sequence part with 3 symbols.

16. A method for supporting a random access procedure of a user equipment in a wireless communication system, the method performed by a base station and comprising:
transmitting downlink control information (DCI) including narrowband physical random access channel (NPRACH) format information; and
receiving a random access preamble including a sequence part and a cyclic prefix (CP) part based on the NPRACH format information,
wherein the DCI including the NPRACH format information is a narrow band physical downlink control channel (NPDCCH) order configured to indicate either one of a first type preamble format or a second type preamble format,
wherein the first type preamble format is configured with a first sequence part and a first CP part, the first sequence part having 5 symbols and the first CP part being attached in front of the first sequence part,
wherein the second type preamble format is configured with a second sequence part and a second CP part, the second sequence part having 3 symbols and the second CP part being attached in front of the second sequence part, and
wherein the first CP part attached to the first sequence part with 5 symbols is shorter than the second CP part attached to the second sequence part with 3 symbols.

17. A base station comprising:
a transceiver; and
a processor configured to transmit, through the transceiver, downlink control information (DCI) including narrowband physical random access channel (NPRACH) format information and to receive, through the transceiver, a random access preamble including a sequence part and a cyclic prefix (CP) part based on the NPRACH format information,
wherein the DCI including the NPRACH format information is a narrow band physical downlink control channel (NPDCCH) order configured to indicate either one of a first type preamble format or a second type preamble format,
wherein the first type preamble format is configured with a first sequence part and a first CP part, the first sequence part having 5 symbols and the first CP part being attached in front of the first sequence part,
wherein the second type preamble format is configured with a second sequence part and a second CP part, the second sequence part having 3 symbols and the second CP part being attached in front of the second sequence part, and
wherein the first CP part attached to the first sequence part with 5 symbols is shorter than the second CP part attached to the second sequence part with 3 symbols.

* * * * *